# United States Patent
Komatsu et al.

(10) Patent No.: US 8,497,022 B2
(45) Date of Patent: Jul. 30, 2013

(54) THREE-METALLIC-COMPONENT TYPE COMPOSITE NANOMETALLIC PASTE, METHOD OF BONDING, AND ELECTRONIC COMPONENT

(75) Inventors: Teruo Komatsu, Osaka (JP); Yoshinori Shibata, Toyota (JP); Hideo Nakamura, Toyota (JP); Masashi Furukawa, Toyota (JP); Ryosuke Gomi, Kariya (JP); Mitsuhiro Kanou, Kariya (JP); Tsukasa Sugie, Kariya (JP); Narutaka Kasuya, Kariya (JP); Shuhei Yamaguchi, Kariya (JP); Toshitaka Ishizaki, Aichi-gun (JP); Tadashi Oshima, Aichi-gun (JP); Hisaaki Takao, Aichi-gun (JP); Naotoshi Tominaga, Nagoya (JP)

(73) Assignees: Applied Nanoparticle Laboratory Corporation, Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/383,825

(22) PCT Filed: Apr. 27, 2010

(86) PCT No.: PCT/JP2010/057509
§ 371 (c)(1),
(2), (4) Date: Jan. 12, 2012

(87) PCT Pub. No.: WO2011/007608
PCT Pub. Date: Jan. 20, 2011

(65) Prior Publication Data
US 2012/0107628 A1    May 3, 2012

(30) Foreign Application Priority Data
Jul. 16, 2009    (JP) .................. 2009-168210

(51) Int. Cl.
*B32B 5/16*    (2006.01)
(52) U.S. Cl.
USPC ........... 428/403; 428/404; 428/405; 428/406; 428/407; 252/500; 252/512; 156/326
(58) Field of Classification Search
USPC ........... 428/403–407; 252/500, 512; 156/326
See application file for complete search history.

(56) References Cited

U.S. PATENT DOCUMENTS

| 2001/0003362 A1* | 6/2001 | Sano et al. ............... 252/512 |
| 2004/0026669 A1* | 2/2004 | Sano et al. ............... 252/500 |
| 2005/0161643 A1* | 7/2005 | Sano et al. ............... 252/512 |
| 2008/0173398 A1* | 7/2008 | Yasuda et al. ............. 156/326 |

FOREIGN PATENT DOCUMENTS

| JP | H06-215617 A | | 8/1993 |
| JP | 06-215617 | * | 8/1994 |
| JP | 2001-176325 A | | 6/2001 |
| JP | 3205793 B | | 9/2001 |
| JP | 2003-342605 A | | 12/2003 |
| JP | 2004-107728 A | | 4/2004 |
| JP | 2005-203304 | * | 7/2005 |
| JP | 2005-203304 A | | 7/2005 |
| JP | 2006-086012 | * | 3/2006 |
| JP | 2006-086012 A | | 3/2006 |
| JP | 2007-95510 A | | 4/2007 |
| JP | 2007-297671 A | | 11/2007 |
| JP | 2008-161907 | * | 7/2008 |
| JP | 2008-161907 A | | 7/2008 |
| WO | WO 00/76699 A | | 12/2000 |
| WO | WO 01/70435 A | | 9/2001 |
| WO | WO 2005/075132 A | | 8/2005 |

* cited by examiner

*Primary Examiner* — Leszek Kiliman
(74) *Attorney, Agent, or Firm* — DLA Piper LLP (US)

(57) ABSTRACT

Provided is a composite nanometal paste which, when a layer of the paste interposed between upper and lower bodies is sintered in an inert gas under no load until the layer turns to a metal layer, attains a shear bond strength between the upper and lower bodies of 10 MPa or higher.
The composite nanometal paste contains, as metallic components, composite metallic nanoparticles comprising metal cores with an average particle diameter of X (nm) and an organic coating layer formed around the circumference, metallic nanofiller particles having an average particle diameter of d (nm), and metallic filler particles having an average particle diameter of D (nm), and satisfies the first relation X<d<D and the second relation X<d<100 (nm). Furthermore, this is a composite nanometal paste in which said average particle diameter d has a size such that said metal nanofiller particle can be embedded into a three pocket formed when said three said metal filler particles are placed on a plane so as to be mutually in contact, and said average particle diameter X has a size such that the gaps that remain within said three pocket are filled.

11 Claims, 16 Drawing Sheets

FIG. 1

Chemical reaction in low-temperature production of composite silver nanoparticles Raw materials     Silver compound: Silver salt     (1)

Alcohol:   $C_nH_{2n+1}OH$   ($1 \leq n \leq 12$)

$= R_nOH$     (2)

$R_n = C_nH_{2n+1}$     (3)

[1] First step: Alcohol adsorption on surface of silver salt particles (Many silver salts are insoluble in alcohols)

Alcohol molecule $R_nOH$ serves as a surfactant $R_n$: Hydrophobic group     OH: Hydrophilic group Hydrophilic group faces toward alcohol, hydrophilic group is adsorbed to hydrophilic surface of silver salt particle

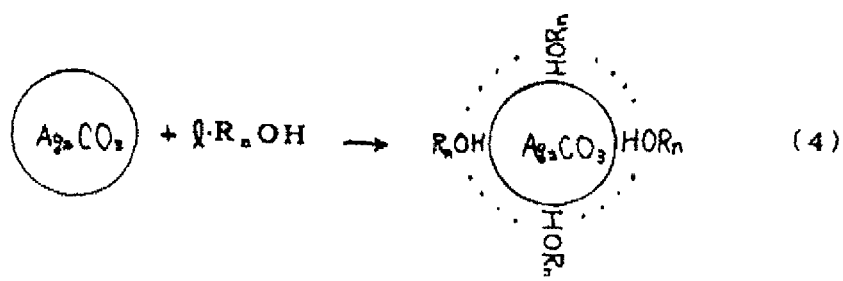

Chemical reaction in low-temperature production of composite silver nanoparticles

[2] Second step: Thermolysis-reduction reaction at surface of silver salt particles
(Case where the silver salt particles are silver carbonate)

<Thermolysis process>

$$Ag_2CO_3 + R_nOH \rightarrow 2Ag + R_{n-1}CHO + CO_2 + H_2O \quad (5)$$

$$Ag_2CO_3 + 2R_nOH \rightarrow 2AgOR_n + CO_2 + H_2O \quad (6)$$

<Reduction process by aldehyde>

$$Ag_2CO_3 + R_{n-1}CHO \rightarrow 2Ag + R_{n-1}COOH + CO_2 \quad (7)$$

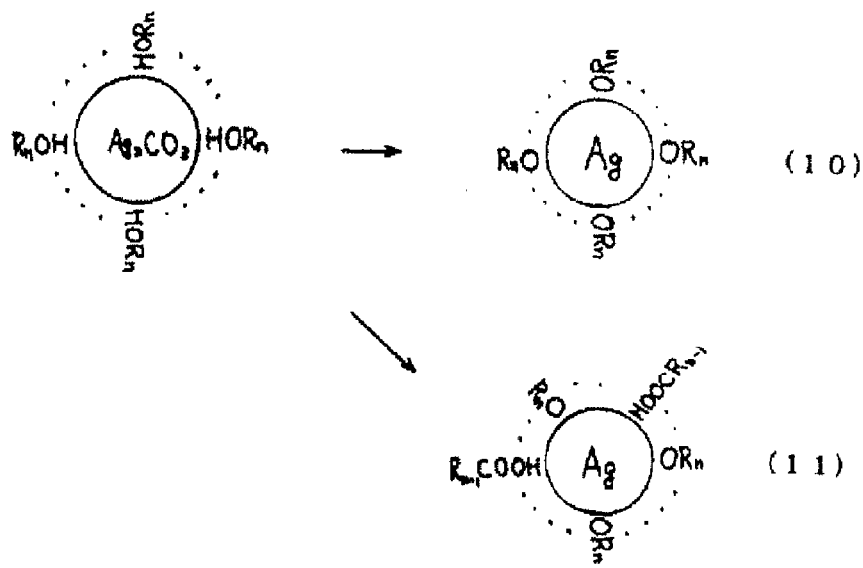

FIG. 7

<Conditions of Characteristic Temperatures of Powder>

Powder : C1AgAL ~ C12AgAL

Thermal analysis under atmosphere: TG, DTA $T_1$(°C): Decomposition start temperature: TG decrease start temperature $T_2$(°C): Decomposition temperature: DTA peak temperature $T_3$(°C): Silverization temperature :DTA final peak temperature, or DTA final peak finishing temperature (TG stabilizing temperature)

PT(°C): Production temperature (1) Temperature increase rate : VT= 1°C/min $$T_1 < T_2 < T_3 \qquad (C1)$$

$$T_2-100 < T_1 < T_2 \qquad (C2)$$

$$T_3 \leq 200 \qquad (C3)$$

$$PT < T_3 \qquad (C4)$$

(2) Temperature increase rate :

$$1(°C/min) \leq VT \leq 20(°C/min)$$

$$T_1(VT) < T_2(VT) < T_3(VT) \qquad (C5)$$

$$T_2(VT)-100 < T_1(VT) < T_2(VT) \qquad (C6)$$

$$T_3(VT) < T_3(1°C/min)+100 \qquad (C7)$$

FIG. 8

Composite nanometal paste containing three metallic components that fulfills the following conditions for forming a compact metal layer <Contains following three types of metallic components>
① Composite metal nanoparticles in which organic coating layer is formed at circumference of metal core with average particle diameter X(nm) : NS
② Metal nanofiller particles with average particle diameter d(nm) : NF
　　Specifically, they can be either
　　　① composite metal nanoparticles with metal core average particle diameter d(nm), or
　　　② metal nanoparticles with average particle diameter d(nm)
③ Metal filler particles with average particle diameter D(nm) : F <Particle diameter conditions>
① First relation:　　X<d<D　　　　　　(12)
② Second relation:　X<d<100　　　　　 (13)

FIG. 10

Composite nanometal paste containing three metallic components that fulfills the following conditions for forming a compact metal layer <Contains following three types of metallic components>

① Composite metal nanoparticles in which organic coating layer is formed at circumference of metal core with average particle diameter $X$ (nm)

② Metal nanofiller particles with average particle diameter $d$ (nm)
   Specifically, they can be either
   ① composite metal nanoparticles with metal core average particle diameter $d$ (nm), or
   ② metal nanoparticles with average particle diameter $d$ (nm)

③ Metal filler particles with average particle diameter $D$ (nm)

<Particle diameter conditions>

| | | |
|---|---|---|
| ① First relation: | $X < d < D$ | (12) |
| ② Second relation: | $X < d < 100$ | (13) |
| ③ Third relation: | $d \leq (2/\sqrt{3} - 1)D$ | (14) |
| That is to say, | $d \leq 0.1547D$ | (15) |
| ④ Fourth relation: | $X \leq [1/3 - 2/[3(2\sqrt{3}-1)]]D$ | (16) |
| That is to say, | $X \leq 0.06278D$ | (17) |

FIG. 11

<Third relation: Eq. (14): Proof of $d \leq (2/\sqrt{3}-1)D$>

Three metal filler particles F with radius R: Close-packed arrangement with mutual contact on plane $$\text{Average particle diameter D} \rightarrow D=2R \qquad (18)$$

First inscribed circle NFmax with radius r is placed in three pocket P that is a gap at center portion Nanofiller particle NF with average particle diameter d: Smaller than first inscribed circle NFmax:

$$d \leq 2r \qquad (19)$$

A, B, C: Centers of three metal filler particles F
O: Center of gravity of equilateral triangle ABC $$AM \times 2/3 = AO \qquad (20)$$
$$2R\sin(60°) \times 2/3 = (R+r) \qquad (21)$$
$$2R \times \sqrt{3}/2 \times 2/3 = (R+r)$$
$$\therefore \ r = (2/\sqrt{3}-1)R \qquad (22)$$
$$r = 0.1547R \qquad (23)$$
$$2r = (2/\sqrt{3}-1)D = 0.1547D \qquad (24)$$
$$\therefore \ d \leq (2/\sqrt{3}-1)D \qquad (25)$$
$$d \leq 0.1547D \qquad (26)$$

∴ It is necessary for average diameter d to be less than or equal to 0.1547 times average particle diameter D of metal filler particles F

FIG. 12

<Fourth relation: Eq. (16): Proof of $X \leq [1/3 - 2/\{3(2\sqrt{3}-1)\}]D$>

In three pocket P, radius x is determined of second inscribed circle NSmax at close-packed position of mutual contact with metal filler particle F and first inscribed circle NFmax
Composite metal nanoparticle NS with average particle diameter X: Smaller than second inscribed circle NSmax:

$$X \leq 2x \qquad (27)$$

$\triangle$CDE: Right triangle $$CD^2 = CE^2 + ED^2 \qquad (28)$$
$$(R+x)^2 = R^2 + \{R\tan(30°) - r - x\}^2 \qquad (29)$$
$$(R+x)^2 = R^2 + \{R \times 1/\sqrt{3} - (2/\sqrt{3}-1)R - x\}^2$$
$$(R+x)^2 = R^2 + \{R - R/\sqrt{3} - x\}^2$$
$$(4 - 2/\sqrt{3})x = (1 - 1/\sqrt{3})^2 R$$
$$\therefore x = [1/3 - 2/\{3(2\sqrt{3}-1)\}]R \qquad (30)$$
$$x = 0.06278R \qquad (31)$$
$$\therefore X \leq [1/3 - 2/\{3(2\sqrt{3}-1)\}]D \qquad (32)$$
$$X \leq 0.06278D \qquad (33)$$

It is necessary for average diameter X of composite metal nanoparticle to be less that or equal to 0.06278 times average particle diameter D of metal filler particle.

FIG. 15

<Relations between Characteristic Temperatures of Powder and Those of Paste>

Powder : C1AgAL ～ C12AgAL

Paste : PC1AgAL ～ PC12AgAL (1) Temperature increase rate : VT=1℃／min $$Tp1 < Tp2 < Tp3 \quad (P1)$$

$$Tp2-100 < Tp_1 < Tp_2 \quad (P2)$$

$$Tp3 \leqq 300 \quad (P3)$$

(2) Temperature increase rate :

$$1(℃／min) \leqq VT \leqq 20(℃／min)$$

$$Tp1(VT) < Tp2(VT) < Tp3(VT) \quad (P4)$$

$$Tp2(VT)-100 < Tp1(VT) < Tp2(VT) \quad (P5)$$

$$Tp3(VT) < Tp3(1℃／min)+100 \quad (P6)$$

(3) Relations between characteristic temperatures of powder and those of paste $$T_1(VT) < Tp_1(VT) < T_1(VT) + 100 \quad (P7)$$

$$T_2(VT) < Tp_2(VT) < T_2(VT) + 100 \quad (P8)$$

$$T_3(VT) < Tp_3(VT) < T_3(VT) + 100 \quad (P9)$$

FIG. 16
(16A)
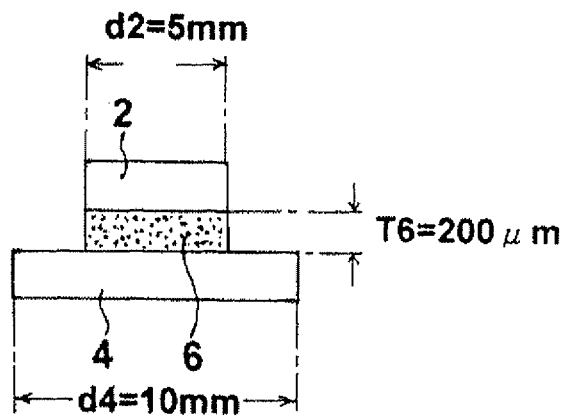
(16B)
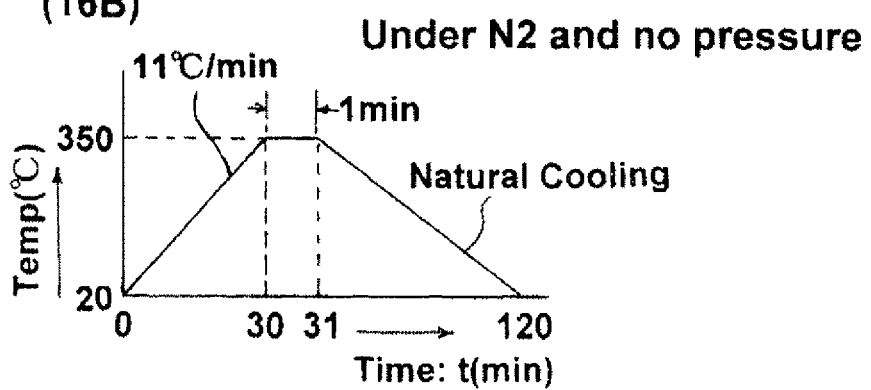
(16C)
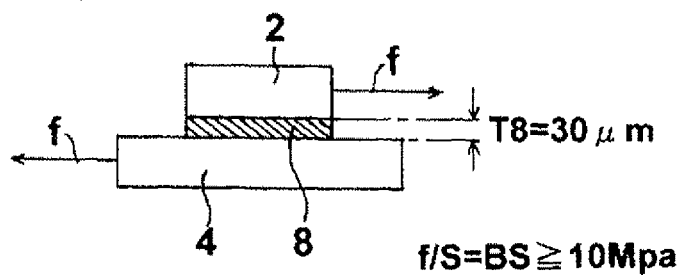

US 8,497,022 B2

THREE-METALLIC-COMPONENT TYPE COMPOSITE NANOMETALLIC PASTE, METHOD OF BONDING, AND ELECTRONIC COMPONENT

FIELD OF THE INVENTION

The present invention concerns a composite nanometal paste containing composite metal nanoparticles in which an organic coating layer is formed at a circumference of a metal core, and especially in particular, it concerns a composite nanometal paste, a method of bonding, and an electronic component in which said composite nanometal paste is metalized by heating at predetermined temperature and volatilizing said organic coating layer.

BACKGROUND ART

Normally, semiconductors, electronic circuits, and electronic devices, among others, have various electronic components fused and fastened to a substrate using solder, to obtain electric conductivity. However, the conventional solders are an alloy of Sn and Pb, and because a usage of Pb is becoming prohibited as an environmental protection measure of the recent years, Pb-free substitute solders are being developed to replace said conventional solders. The melting point of a eutectic solder of Sn and Pb is 183° C., and the melting point of an Sn/Ag/Cu solder that is a conventional substitute solder is 217° C. When soldering is done on a resin substrate, because the heat resistance of resin is low, the melting point of a conventional substitute solder can be too high, causing damage to the resin substrate. There has been a demand for a low temperature solder.

As for the characteristics of a substitute solder, naturally it should not contain Pb, and moreover, the metalization temperature should be low, but, in addition, it is desirable that the safety is high, it is not corrosive, it is capable of bonding under no-load (using only self-weight, and applying no further load) just like a solder, and moreover, the bond strength is high. Composite metal nanoparticles of Cu, Ni, Ag, and others are being developed as a material meeting this expectation.

Next, nanometal pastes were produced, in which a viscosity imparting agent and a solvent were mixed into these metal nanoparticles. For example, the Japanese Patent Laid-Open No. 2007-297671 has been published as Patent Document 1. In this document, a nanometal paste is suggested, in which the average particle diameter of the primary particles of silver nanoparticles is less than or equal to 200 nm, and a sheet-like structure having remnants of the primary particles of these silver nanoparticles is made to be the metallic component.

The present inventors made nanometal pastes using commercially available silver nanoparticles whose average particle diameter was less than or equal to 200 nm, and did experiments to bond a copper disc with diameter of 5 mm to another with diameter of 10 mm. That is to say, a nanometal paste layer of 300 μm thickness was applied and formed on the surface of a copper disc with diameter of 5 mm, a copper disc with diameter of 10 mm is adhered to this paste surface, and both discs were bonded by sintered at a firing temperature of 350° C. and sintering said paste layer into a metal layer. After cooling, the shear bond strength that is the fracture limit was measured by separating and shearing both by applying an external force toward the surface direction of said copper disc with diameter of 5 mm. However, no matter how often it was repeated, bond strength at a level of only 0.1-1 MPa was obtained under no-load. The bond strength that the present inventors require is at least greater than or equal to 10 MPa, where a semiconductor is damaged. In particular, in an electronic component used under a high temperature and an electronic component used under strong motion, a high bond strength greater than or equal to 10 MPa, in which the joining portion is not damaged but the semiconductor is damaged, is required. By the nanometal pastes described above, it is absolutely impossible to be put into practical use.

An improvement of silver nanoparticles is needed if high bond strength greater than or equal to 10 MPa is to be stably obtained. Usually, for nanoparticles to fit into the definition, the particle diameter of said silver nanoparticles must be less than or equal to 100 nm. The average particle diameter of said silver nanoparticles is 200 nm, and they have a flaw that they are too large to be a metallic component. Moreover, because such silver nanoparticles mutually aggregate easily, it is estimated that the silver nanoparticles aggregated mutually and became large lump-like silver particles in the previously described nanometal paste, and as a result, even when it was fired, many gaps were caused in the bonding metal layer, and the bond strength deteriorated. To prevent aggregation, silver nanoparticles that can be monodispersed in an organic solvent must be used, and for this, they need to be composite silver nanoparticles in which an organic coating layer is formed circumferentially. The reason is because organic coating layers repel mutually, and therefore composite silver nanoparticles are stable in solvent, and they monodisperse. Therefore, to begin with, the present inventor started to develop composite silver nanoparticles.

The present inventors searched, and as a result, it was found that Patent Documents 2-9 shown subsequently are publicly known as patent documents concerning composite metal nanoparticles, and by correcting the flaws in these publicly known documents, the present invention was completed.

First, the Japanese Patent Laid-Open No. 2008-161907 was published as Patent Document 2. This patent application publication discloses a bonding material in which organic-coated metal particles with an average particle diameter of less than or equal to 100 nm, and organic-coated metal particles with a particle size distribution of 100 nm-100 μm, are mixed. The organic-coated metallic material is composite metal particles in which an organic coating layer surrounds a metal core, and it has characteristics in common with the composite metal nanoparticles used in the present invention. The main point of this patent application publication states that the bond strength increases because the organic-coated metal particles less than or equal to 100 nm fill the gap between the metal particles greater than or equal to 100 nm, but that the details of the mechanism are unknown. About the particle diameter relation between the two kinds of metal particles, it is only described that they are metal particles greater than or equal to 100 nm, and metal particles less than or equal to 100 nm. Because the mechanism is unknown, it is a fact that there is no further mention about the particle diameter relation at all.

The Japanese Patent Bulletin No. 3205793 (Japanese Patent Laid-Open No. 10-183207) was published as Patent Document 3. Silver organic compounds (particularly, silver organic complexes) were chosen as starting materials. Under the inert gas atmosphere from which air was blocked, said silver organic compound was heated at a temperature greater than or equal to the decomposition start temperature and below the complete decomposition temperature, and composite silver nanoparticles were manufactured, in which the organics originating from said silver organic compound were made to be the coating layer around the circumference of silver cores that had been decomposed and reduced. This preparation method is a solid-gas reaction. The particle diameter of the silver cores is 1-100 nm, and therefore they are referred to as composite silver nanoparticles. Specifically, when 100 g of solid silver stearate was put in a flask under nitrogen gas stream, and heated at 250° C. for 4 hours, composite silver nanoparticles having an organic coating layer of stearate group around the circumference of a silver core with 5 nm particle diameter were produced.

Because in said manufacturing method, a solid body of silver stearate is heated without a solvent, the produced composite silver nanoparticles are difficult to disperse, and there is a flaw that a large number of composite silver nanoparticles become large secondary particles that are bonded in a lump-like state. Moreover, the production temperature is high, namely 250° C., and it can be seen that the metalization temperature of the composite silver nanoparticles is extremely high, namely 220° C. Silver nanoparticles whose production temperature is high also have a high silverization temperature. The melting point of a regular Sn—Pb solder is 183° C., and considering that the desired metalization temperature of composite silver nanoparticles is less than or equal to 200° C., said metalization temperature (silverization temperature) is too high at 220° C., and it is difficult to use them as a substitute low-temperature solder. It is thought that the high metalization temperature is caused by the very large particles in a lump-like state, and also by the high decomposition temperature of the stearate group. Moreover, the inventors have confirmed that said silver core is not a single crystal, but simply an atom aggregate or a polycrystal. When the silver cores are polycrystals or disordered, electronic and heat scatterings are caused at a large number of grain boundary surfaces, and as a result, it becomes a cause for lowering of the electric and heat conductivities.

Next, Japanese Patent Laid-Open No. 2003-342605 bulletin was published as Patent Document 4. Said Patent Document 4 is an invention in which one of the present inventors participated in as an inventor. A metal organic compound was dissolved or dispersed in an organic solvent or water, and successfully produced composite silver nanoparticles coated with the organics originating from said metal organic compound. This preparation method is a solid-liquid reaction. Moreover, when this composite silver nanoparticles were observed under a high resolution transmission electron microscope, lattice images were observed on the silver cores, and it was confirmed that they were single crystal silver cores. It is thought that, based on the solid-liquid reaction method, the metal organic compound dissolved and dispersed into the solvent as molecules, said molecules were reduced to precipitate silver atoms, and they became single crystals through recombination between the silver atoms. That is to say, it is thought that the single crystal characteristics are caused by intermolecular reaction. Because the silver cores are single crystals, they have an advantage that the electric and heat conductivities are high. However, as for the silverization temperature, it is written in [0076] that the composite silver nanoparticles with stearate coating were heated at 250° C. for 10 minutes. In other words, a weak point of Patent Document 4 is that the silverization temperature is very high at 250° C. A reason the silverization temperature is high is that the decomposition temperature of the carboxylates that comprise the coating layer is high, for they start from silver organic compounds such as silver acetate, silver hexanoate, and silver octanoate, among others. A further measure is needed to make the metalization temperature less than or equal to 200° C.

Thus, the WO00/076699 bulletin was published as Patent Document 5. One of the present inventors is one of the inventors of this international application publication. Multiple inventions are disclosed in this publication, but among them, a method for processing a metal inorganic compound by means of a surfactant was disclosed for the first time, and a pathway was opened for using a metal inorganic compound as the starting material. That is to say, it consists of the first step, where an ultra-fine particle precursor is formed by making a colloid out of a metal inorganic compound in an nonaqueous solvent by means of surfactant, and the second step, where a reducing agent is added to this colloidal solution, and said ultra-fine particle precursor is reduced, generating composite metal nanoparticles on which a surfactant shell is formed as a coating layer around the circumference of a metal core.

Because a metal inorganic compound is dissolved in a nonaqueous solvent in said method, it has a characteristic that the produced composite metal nanoparticles disperse within the nonaqueous solvent, and therefore it is difficult for them to be in a lump-like state. However, the embodiments disclose copper oleate, silver abietate, silver acetate, nickel oleate, diethyl hexane indium, copper acetate, and silver stearate, and only organometallic compounds are put into use. Moreover, it was found that the metalization temperature of the composite silver nanoparticles produced from silver stearate was high, at 220° C. A further measure to make the metalization temperature less than or equal to 200° C. is need. To make it have even higher characteristics than Sn—Pb solders, even further effort is required for making the metalization temperature less than or equal to 150° C. Moreover, because a determination of the single crystallinity/polycrystallinity of the silver cores was not made in Patent Document 5, the quality of the electrical and thermal conductivities of the composite metal nanoparticles cannot be determined.

Under the above circumstance, the WO01/070435 bulletin was published as Patent Document 6. This international application publication discloses composite metal nanoparticles in which a coating layer is formed, comprising of organic compounds with carbon number of 4 or higher and including alcohol hydroxyl group, around the circumference of a metal core with 1-100 nm particle diameter that is obtained from a metal salt. Moreover, as an organic compound including a functional group with an adsorptive property, a higher alcohol whose carbon number is greater than or equal to 6 is described.

Furthermore, the WO2005/075132 bulletin was published as Patent Document 7. This publication discloses composite metal nanoparticles whose central part comprises a metal core, and having around it a coating layer of organics whose thermal desorption start temperature is greater than or equal to 140° C. and less than 190° C. As the manufacturing method, it is described that an inorganic metal salt is made to coexist with an organic material, the inorganic metal salt disintegrates, metal cores are formed, and composite metal nanoparticles are produced, in which coating layers of organic matter is formed around the circumference of said metal cores. Also, composite metal nanoparticles are disclosed, in which a coating layer of organic matter is formed around the circumference of an inorganic metal salt or an inorganic metal compound produced by decomposition.

The Japanese Patent Laid-Open No. 2007-95510 bulletin has been published as Patent Document 8. In claim 1 of Patent Document 8, an electroconductive paste is disclosed, comprising composite metal nanoparticles composed of metallic cores consisting of a metal component originating from a metal salt expressed by a chemical formula of $(R-A)_n-M$, organic coating layers originating from said metal salt, and an organic solvent. R is a hydrocarbon group of carbon number 4-9, A is COO, OSO3, $SO_3$ or $OPO_3$, and M is silver, gold or a platinum group. Therefore, composite silver nanoparticles are included.

The Japanese Patent Laid-Open No. 2004-107728 bulletin is disclosed as Patent Document 9. In Claim 1 of Patent Document 9, composite metal nanoparticles are described, that contains organic coating layers whose main components are C, H and O are placed in the circumference of metal cores with an average particle diameter of less than or equal to 100 nm. It is described that these organic coating layers are produced from an organic acid metal salt.

[Patent Document 1] Japanese Patent Laid-Open No. 2007-297671 bulletin
[Patent Document 2] Japanese Patent Laid-Open No. 2008-161907 bulletin
[Patent Document 3] Japanese Patent No. 3205793 (Japanese Patent Laid-Open No. 10-183207 bulletin)
[Patent Document 4] Japanese Patent Laid-Open No. 2003-342605 bulletin
[Patent Document 5] WO00/076699 bulletin
[Patent Document 6] WO01/070435 bulletin
[Patent Document 7] WO2005/075132 bulletin
[Patent Document 8] Japanese Patent Laid-Open No. 2007-95510 bulletin
[Patent Document 9] Japanese Patent Laid-Open No. 2004-107728 bulletin

DISCLOSURE OF THE INVENTION

Problems to be Solved by the Invention

As explained previously, in Patent Document 1, conditions for forming a compact metal film having high bond strength, upon firing a nanometal paste layer, is not disclosed at all. Thus, the present inventors made nanometal pastes according to a conventional paste manufacture procedure. That is to say, they are pastes, obtained by kneading silver nanoparticles with an average particle diameter of 200 nm described in Patent Document 1, with a viscosity imparting agent and a solvent. Just as already stated above, this paste does not give rise to bond strength greater than or equal to 10 MPa. As a result of having considered the reasons, the following can be conceived. First, when a large number of uniform spheres of 200 nm are sintered to make them continuous, innumerable gaps remain between the particles, the area of contact becomes relatively small, and as a result, the bond strength between the particles becomes small. Second, the nanometal particles of 200 nm do not monodisperse naturally, but instead they aggregate mutually to form lump-like particles. There are innumerable gaps in the lump-like particles, and these gaps persist even after sintering. Moreover, these gaps are not uniform gaps, but instead are innumerable gaps with a size variation between large and small, and they cause a decrease in the area of contact between the particles. It is thought that this idea of filling these gaps is missing in Patent Document 1.

As already described, in Patent Document 2, a bonding material is disclosed, in which organic-coated metal particles with an average particle diameter of less than or equal to 100 nm, and organic-coated metal particles within a range of 100 nm-100 μm are mixed to improve the bond strength. Thus, the present inventors produced composite silver nanoparticles with an average particle diameter of 50 nm, and succeeded in producing an organic-coated metal particles with an average particle diameter of 1 μm, as an intermediate value between 100 nm and 100 μm. A paste was made by mixing these two types of particles with a viscosity imparting agent and a solvent, but even when the paste layer was fired to form a metal layer, it was impossible to obtain bond strength greater than or equal to 10 MPa. When the cross section of said mixed metal layer was photographed as an electron microscopy image, innumerable gaps were observed. Therefore, it is thought that innumerable gaps still exist within the mixed metal layer of the two kinds of particles, large and small particles, and that these gaps obstruct a realization of a bond strength greater than or equal to 10 MPa. In other words, the metal layer from large particles (Patent Document 1) failed in terms of the bond strength, and even the mixed metal layer of large and small particles (Patent Document 2) failed in bringing about bond strength greater than or equal to 10 MPa. Moreover, a detailed size condition of the large and the small particles is not suggested at all, and because merely large and small particles of certain sizes are mixed, it must be said that this is too careless a method.

To fill the above gaps, the present inventors conceived a nanometal paste that contains three types of metallic component particles of large, medium, and small sizes with particular size relations, and particularly having composite metal nanoparticles as the small particles. The present inventors confirmed that a compact metal film having high bond strength greater than or equal to 10 MPa can be realized, and the present invention was completed.

Moreover, as the above composite metal nanoparticles, composite metal nanoparticles in which metalization is possible at a low temperature of less than or equal to 200° C. were developed, and these composite metal nanoparticles for low temperature firing was applied to the nanometal paste of the present invention. Such technical concept is not described in Patent Document 1, and it is not even suggested either. To confirm the importance of the above composite metal nanoparticles, comparisons with Patent Documents 6-9 are made for explanation.

In Patent Document 6, it is described that if in composite silver nanoparticles of a particle diameter of 5-10 nm the decomposition temperature of the organic compound is less than or equal to 80° C., the silver coating film formation temperature becomes 80° C., and that if the decomposition temperature is greater than or equal to 80° C., a silver coating film can be formed if they are heated up to that decomposition temperature. However, said statements only are a wishful observation, and such example is not mentioned in the embodiments at all. In the following, it will be explained specifically.

In Embodiment 1, it is described that when copper formate and 1-decanol (C number of 10) are reacted, the solution changes color from around 185° C. and composite copper nanoparticles are formed, and that the copperization firing temperature is 200-350° C., preferably 250-300° C. In Embodiment 2, it is described that composite silver nanoparticles were formed from silver carbonate and myristic acid (C number of 14) at 230° C. by a color change of the solution, and a silver coating film is formed at 250° C. by firing under air. In Embodiment 3, it is confirmed by a change in the solution color that composite silver nanoparticles are produced from silver carbonate and stearyl alcohol (C number of 18) by application of heat at 150° C. for 1 hour, but the silverization temperature under nitrogen atmosphere is described as 250° C. In Embodiment 4, it is confirmed by a change in the solution color that composite silver nanoparticles are produced from silver carbonate and phenol (C number of 6) by application of heat at 180° C. for 1 hour, and the silverization temperature is described as 300° C. In Embodiment 5, it is confirmed by a change in the solution color that composite copper nanoparticles are produced from copper acetate and lauryl alcohol (C number of 12) by application of heat at 100° C. for 1 hour, but the copperization temperature under an atmosphere of hydrogenated nitrogen was 250° C.

Furthermore, in Embodiment 6, it is confirmed by a change in the solution color that composite platinum nanoparticles were produced from platinum chloride and ethylene glycol (C number of 2) by application of heat at 180° C. for 1 hour, but the heat-treatment temperature was 300° C. In Embodiment 7, it is confirmed by a change in the solution color that composite copper nanoparticles were produced from copper acetate and lauryl alcohol (C number of 12) at 110° C., but the copperization temperature under nitrogen atmosphere was 300° C. Lastly, in Embodiment 8, it is confirmed by a change in the solution color that composite copper nanoparticles were produced from copper acetate and ethanol (C number of 2) and a nonionic surfactant (sorbitan tristearate) at 150° C., but the copperization temperature under nitrogen atmosphere was 300° C.

As described above, in the eight embodiments of Patent Document 6, merely a silver, copper, or platinum core having an organic coating layer with the C number of 14 or more is described, and moreover, the silverization, copperization, or platinization temperature is high, namely greater than or equal to 200° C. Because the carbon number is 14 or greater, the molecular weight becomes large, the weight of the organic coating layer increases relative to the silver core weight, the amount of the exhaust gas at the time of firing increases by the increased quantity of the organic component, and the applicability as a paste decreases. Moreover, the metalization temperatures of all of the composite silver nanoparticles considerably exceed 200° C., and composite metal nanoparticles realizing the desired metalization temperature of less than or equal to 200° C. has not been produced. Therefore, it is clear that they are unsuitable as a substitute solder. That is to say, composite silver nanoparticles that can be used in the present invention must be composite silver nanoparticles that can realize a metalization at less than or equal to 200° C., even more preferably at less than or equal to 150° C. The only one that realizes this is the composite silver nanoparticles having an organic coating layer of alcohol origin that some of the present inventors developed. That is to say, it is composite silver nanoparticles having organic coating layer consisting of an alcohol molecule derivative with carbon number of 1-12, alcohol molecule residues, or one or more types of alcohol molecule. However, the fact is that, in said prior documents, such composite silver nanoparticles are not described nor suggested.

A matter that is impossible to understand is mentioned in Patent Document 7. It is described that when an inorganic metal salt and an organic substance are made to coexist, a coating layer of organic matter is formed in the circumference of a central core that includes an inorganic metal salt or a decomposed inorganic metal compound. For example, in Page 6, it is described that when a mixture of silver carbonate (inorganic metal salt) and myristyl alcohol (organic substance, C number of 14) are reacted at 120° C. for 2 hours, composite silver nanoparticles are formed in which an organic matter is physically adsorbed to silver or silver carbonate. It is clear from the following reaction equation that when an organic matter adheres around the circumference of silver carbonate, the thermolysis temperature for precipitating silver from silver carbonate becomes greater than 400° C.

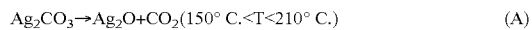

$$Ag_2CO_3 \rightarrow Ag_2O + CO_2 (150° C. < T < 210° C.) \quad (A)$$

$$Ag_2O \rightarrow 2Ag + \tfrac{1}{2}O_2 (T > 400° C.) \quad (B)$$

At first, the reaction of Equation (A) occurs, but the decomposition temperature in Equation (B) is greater than or equal to 400° C., and a metalization at less than or equal to 200° C. cannot be achieved, and it is also unsuitable as a substitute for Sn—Pb solders with melting point of 183° C. Moreover, the crystallinity of the silver cores is not described at all, and a determination of the quality of the electrical and thermal conductivities is completely impossible.

Also, myristyl alcohol has the C number of 14 and thus a high molecular weight, and so it causes a shortcoming that the weight of the organic coating layer with respect to the silver core increases, and firing temperature becomes high, and at the same time, the amount of the exhaust gas at the time of firing increases, and a large quantity of voids occurs at the time of the bonding, thus decreasing the adequacy as a paste for bonding.

In the composite metal nanoparticles of Patent Document 8, metal cores and organic coating layers are formed as the decomposition products after decomposing a metal salt, and they are different from the present invention in that the start from an organometallic compound. The present invention forms the silver cores from silver carbonate, and the organic coating layers from alcohol, and therefore the manufacturing methods are completely different. Moreover, the organic coating layers are a bound group between a hydrocarbon group and COO, $OSO_3$, $SO_3$, or $OPO_3$, and therefore the structure is complicated and the decomposition temperature high. In particular, because it includes sulfur S, $SO_X$, an air pollution component is generated by firing, and therefore it does not meet the environmental standard. As described in [0018], even if they can achieve a metalization temperature of around 150° C., they are composite metal nanoparticles that it is impossible to carry out. Also, they have a shortcoming that they contain S and P that are unsuitable for semiconductor bonding, and they cannot be used for semiconductor bonding because of a possibility that S and P diffuses into the semiconductor at the time of the bonding. Moreover, the crystallinity of the silver cores is not described at all, and a determination of the quality of the electrical and thermal conductivities is completely impossible.

Because in the composite metal nanoparticles of Patent Document 9, organic coating layer is formed by decomposing an organic acid metal salt, the organic coating layers are an organic acid group, and the volatilization temperature becomes considerably high. It is mentioned in [0031] that the melting point is 210° C., and it is mentioned in [0068] that they are fired in a temperature range of 210-250° C. Therefore, a metalization at 200° C. or below, preferably at 150° C. or below, that the present invention is aimed at, cannot possibly be realized by Patent Document 8. Moreover, a determination of the quality of the electrical and thermal conductivities is completely impossible.

The present invention was done in view of the above problems. First, to form a compact metal layer producing a high bond strength greater than or equal to 10 MPa, the metallic components of the nanometal paste are made to consist of three kinds of metallic components of small, medium, and large average particle diameters, namely small particles, medium particles, and large particles, and by filing the spaces between the large particles with the medium particles, and filling the remaining gaps with the small particles, a compact metal layer with few gaps is formed after sintering. As a result, high bond strength greater than or equal to 10 MPa has been achieved. More specifically, it is composed of composite metal nanoparticles (metal core average particle diameter: X(nm)) that are the small particles, metal nanofiller particles (metal average particle diameter: d(nm)) that are the medium particles, and metal filler particles (metal average particle diameter: D(nm)) that are the large particles. Also, particle diameter conditions of the first relation of X<d<D and the second relation of X<d<100 (nm) are set. Thus, a compact metal layer has been realized. Furthermore, the present invention was came to conception upon discovering that a more compact metal layer can be formed, if three large particles are brought into contact and thus positioned, the average particle diameter of the medium particles is set so that the medium particles can be inserted into the three pocket that is the central gap of the three large particles, and furthermore, the average particle diameter of the small particles is set so that small particles can be inserted into the remaining gaps, to realize the relations between particle diameters X, d, D.

Second, a composite nanometal paste that realizes a high bond strength was established, by using, as said small particles, composite metal nanoparticles in which a low temperature firing is possible, that is to say, composite silver nanoparticles having organic coating layers originating from an alcohol with C number of 1-12. Because composite metal nanoparticles monodisperse and moved freely inside the paste, they move so that the gaps are filled, and a compact metal layer can be formed by firing. Also, using composite metal nanoparticles with large diameter as metal nanofiller particles with d<100 (nm) that were the medium particles was successful. It is impossible by the current technology to produce metal particles of about 100 nm using a mechanical method, and even if the production were possible, the metal microparticles would aggregate immediately to form lump-like particles. Therefore, the present invention was completed by confirming that when said composite metal nanoparticles are reacted for a long time, their metal cores increase in diameter, and end up as medium-sized particles whose average particle diameter is nearly 100 nm, and also confirming that they repel mutually because of a trace amount of organic coating layers around the circumference, and they are not prone to aggregation. Moreover, by regulating the reaction temperature and time, it becomes possible to control freely the metal core average particle diameter of the composite metal nanoparticles.

With the present invention, alcohol-originating organic coating-type composite metal nanoparticles are used, in which the metal core mass has considerably increased from the conventional nanoparticles because the C number is small, and metalization temperature T3 is made to be lower than 200° C. when thermally analyzed at temperature increase rate VT=1° C./min. As a metal, noble metals such as Au, Pt, Ag, Pd, Rh, Ru, Os, Ir, and base metals such as Cu, Ni can be used. It became clear that if, in particular, Ag (silver) is used, low-priced, stable composite metal nanoparticles could be provided. Because said alcohol-originating organic coating layer comprises one or more types among an alcohol molecule derivative, an alcohol molecule residue, and an alcohol molecule, only $H_2O$ and $CO_2$ are generated when fired, and the environmental standards are completely met. Moreover, because it metalizes at 200° C. or less, it can be used as a substitute for Pb—Sn solders. Moreover, composite silver nanoparticles that can be tired at a low temperature, in which the mutual relation of decomposition start temperature T1 and decomposition temperature T2 when thermally analyzed at a temperature increase rate VT=1° C./min is limited within a range of T2−100≦T1≦T2, and also satisfy an inequality of T1<T2<T3, can be used. Because production temperature PTCC) of such composite silver nanoparticles can be made lower than metalization temperature T3, a composite nanometal paste using composite silver nanoparticles satisfying PT≦T3≦200° C. can be provided. A method of bonding, in which electronic components are bonded by means of this composite nanometal paste, has been established. Furthermore, as described above, because specifically the alcohol-originating material is an alcohol derivative, an alcohol residue, or an alcohol molecule, and only $H_2O$ and $CO_2$ are generated upon firing, it has superior environmental characteristics, and can be effectively applied to bonding of electronic components such as semiconductors. Among the alcohol derivatives, carboxylic acids, carboxylates, alkoxides, and alkoxide groups are included, and compounds in general that are derived from alcohols by chemical reaction are included.

Means to Solve the Problems

The present invention was done to solve the above problems, and the first embodiment of the present invention is a composite nanometal paste, wherein said composite nanometal paste consists of as metal components, a composite metal nanoparticle on which an organic coating layer is formed at a circumference of a metal core with an average particle diameter of X (nm), a metal nanofiller particle with an average particle diameter of d (nm), and a metal filler particle with an average particle diameter of D (nm); it has a first relation of X<d<D and a second relation of X<d<100 (nm); and said composite metal nanoparticle, said metal nanofiller particle, and said metal filler particle sinter compactly when a metal layer is formed by volatilization of said organic coating layer by firing.

The second embodiment of the present invention is a composite nanometal paste, wherein said metal nanofiller particle is a composite metal nanofiller particle on which an organic coating layer is formed at a circumference of a metal core, and said metal layer is formed by volatilizing said organic coating layer of said metal nanofiller particle through said firing.

The third embodiment of the present invention is a composite nanometal paste, wherein average particle diameter d of said metal nanofiller particle has a size so that said metal nanofiller particle is inserted inside a three pocket formed when three said metal filler particles are placed on a plane in a mutually contacting condition, and average particle diameter X of a metal core of said composite metal nanoparticle has a size so that said metal core of said composite metal nanoparticle is inserted inside a gap of said metal filler particles and said metal nanofiller particle in said three pocket.

The fourth embodiment of the present invention is a composite nanometal paste, wherein said average particle diameters X, d, and D satisfy $X \leq [\frac{1}{3} - 2/\{3(2\sqrt{3}-1)\}]D$ and $d \leq (2/\sqrt{3}-1)D$.

The fifth embodiment of the present invention is a composite nanometal paste, wherein a solvent and/or a viscosity imparting agent is added.

The sixth embodiment of the present invention is a composite nanometal paste, wherein paste metalization temperature Tp3 (° C.) is less than or equal to 300° C. when said composite nanometal paste is thermally analyzed under atmosphere at temperature increase rate VT=1° C./min.

The seventh embodiment of the present invention is a composite nanometal paste, wherein paste metalization temperature Tp3 (VT) satisfies Tp3(VT)<Tp3(1° C./min)+100, where a unit of temperature is ° C., when said composite nanometal paste is thermally analyzed under atmosphere at temperature increase rate VT=1-20° C./min.

The eighth embodiment of the present invention is a composite nanometal paste, wherein paste decomposition start temperature Tp1(VT) and paste decomposition temperature Tp2(VT) satisfy Tp2(VT)−100<Tp1(VT)<Tp2(VT), where a unit of temperature is ° C., when said composite nanometal paste is thermally analyzed under atmosphere at temperature increase rate VT=1-20° C./min.

The ninth embodiment of the present invention is a composite nanometal paste, wherein, when said composite nanometal paste is thermally analyzed under atmosphere at temperature increase rate VT1-20° C./min, paste decomposition start temperature Tp1(VT), paste decomposition temperature Tp2(VT), and paste metalization temperature Tp3(VT) increase with an increase of said temperature increase rate VT, while satisfying a relation of Tp1(VT)<Tp2(VT)<Tp3(VT), a unit of temperature being ° C.

The tenth embodiment of the present invention is a composite nanometal paste, wherein, when said composite metal nanoparticle is thermally analyzed under atmosphere at temperature increase rate VT(° C./min), a unit of temperature being ° C., so that decomposition start temperature T1(VT), decomposition temperature T2(VT), along with metalization temperature T3(VT) of said composite metal nanopartiele are defined, and said composite nanometal paste is thermally analyzed under atmosphere at temperature increase rate VT (° C./min), so that when paste decomposition start temperature Tp1 (VT), paste decomposition temperature Tp2(VT), along with paste metalization temperature Tp3(VT) of said composite nanometal paste are defined, one or more of T1(VT)<Tp1(VT)<T1(VT)+100, T2(VT)<Tp2(VT)<T2(VT)+100, T3(VT)<Tp3(VT)<T3(VT)+100 are established.

The eleventh embodiment of the present invention is a method of bonding, wherein the composite nanometal paste of any one of the first to tenth embodiment is provided, a paste layer is formed between a lower body and an upper body by said composite nanometal paste, and said lower body and said upper body are bonded by sintering said paste layer into a metal layer by application of heat.

The twelfth embodiment of the present invention is a method of bonding, wherein a shear stress, that is to say, a bond strength, when said lower body and said upper body are sheared in a direction parallel to said metal layer, said lower body and said upper body being joined through said metal layer under no-load and inert gas, is greater than or equal to 10 (MPa).

The thirteenth embodiment of the present invention is an electronic component, wherein it was produced by the method of bonding according to the eleventh or twelfth embodiment.

Effects of the Invention

According to the first form of the present invention, an advantage is provided, in which the metal layer formed when a paste layer is sintered can be formed into a compact metal layer with few gaps, by composing the metallic components of nanometal paste from three types of metallic components of small, medium, and large, that is to say, from small particles, medium particles, and large particles; filling the gaps between large particles with medium particles; and filling up the gaps between large particles and medium particles with small particles. As a result, a metal layer joint having a high electric conductivity, high heat conductivity, and high bond strength becomes possible. In particular, high bond strength greater than or equal to 10 MPa is achieved. More specifically, it is composed from composite metal nanoparticles (metal core average particle diameter: X (nm)) that are the small particles, metal nanofiller particles (metal average particle diameter: d (nm)) that are the medium particles, and metal filler particles (metal average particle diameter: D (nm)) that are the large particles, and the particle diameter conditions are set so that the first relation of X<d<D and the second relation of X<d<100 (nm) are satisfied. Because of this, the gaps between the metal filler particles can be filled with the metal nanofiller particles, and the remaining gaps can be filled with the composite metal nanoparticles. When it is put through a firing process, a compact metal layer nearly free of gaps can be realized. This metal layer can become a bonding metal layer for electronic components, semiconductors and such, and it can show good electrical and mechanical characteristics. Because the small particles are composed of composite metal nanoparticles, they monodisperse throughout the whole paste, move and are placed to fill the gaps, and form a compact metal layer upon firing. For said metal nanofiller particles, metal particles with an average particle diameter of less than or equal to 100 nm can be used, and composite metal nanoparticles having metal cores with an average particle diameter of less than or equal to 100 nm can also be used. When metal particles with an average particle diameter of less than or equal to 100 nm are hard to make by machining or other processing methods, composite metal nanoparticles in which the metal core is forcibly enlarged by a high temperature/long duration reaction can be used. Especially, since X, d, D are average particle diameters, particles smaller than those average particle diameters are contained in a large quantity. Because this group of extremely small particles become embedded into the gaps between the small, medium, and large particles, even more compact metal layer is formed.

According to the second form of the present invention, composite metal nanoparticles with a large diameter, in which an organic coating layer is formed on the circumference of the metal cores, are used as said metal nanofiller particles which are medium particles. Because of this, they can monodisperse throughout the whole paste, and easily enter the gaps between the metal filler particles. The organic coating layer of the composite metal nanoparticles composing the small and the medium particles gasify by firing, the metal filler particles and the metal cores of medium and small sizes move mutually and bond in the manner that they fill the gaps, which is effective in increasing the compactness of metal layer furthermore. For producing said composite metal nanoparticles which are the medium particles, if they are reacted at a high temperature for a long time, the particle diameter of the metal cores can be steeply increased, and it is advantageous in that it is possible to freely make the metal core particle diameter throughout a range of 1 to several hundred nanometers. Among them, composite metal nanoparticles with average metal core particle diameter of less than or equal to 100 nm, indicated by X<d<100 (nm), is selectively used in the present invention. Moreover, because the average particle diameters are X(nm) and d(nm), the particle diameters are distributed from small to large diameters in reality. The ultrafine particles distributed at smaller diameters enter the gaps of said large, medium, and small particles so that they are filled, and it becomes even more possible to form a compact metal layer. Therefore, it has an effect that it can freely form a metal layer of high electric conductivity, heat conductivity, and bond strength.

According to the third form of the present invention, average particle diameter d of said metal nanofiller particles has a size so that said metal nanofiller particles are inserted inside three pockets formed when three said metal filler particles are placed on a plane in a mutually contacting condition. Also, average particle diameter X of the metal cores of said composite metal nanoparticles has a size so that said metal cores of said composite metal nanoparticles are inserted inside gap of said metal filler particles and said metal nanofiller particles in said three pockets. That is to say, because average particle diameters X and d of the metal cores of the small and medium particles are set so that three pockets are filled under conditions that large particles are closest packed, a compact metal layer can be formed while the large, medium, and small particles move so that they mutually fill the gaps at the time of firing. Moreover, because D, d, X are average particle diameters, minute ultrafine particles are present in a large quantity. A metal layer is formed so that the group of these ultrafine particles fills the remaining gaps, and it became possible to maximally increase the compact degree of the metal layer. Therefore, it has an effect that it can freely form a metal layer of high electric conductivity, heat conductivity, and bond strength.

According to the fourth form of the present invention, a composite nanometal paste, whose said average particle diameters X, d, and D satisfy $X \leq [\frac{1}{3} - 2/\{3(2\sqrt{3}-1)\}]D$ and $d \leq (2/\sqrt{3}-1)D$, is offered. Average particle diameter X is the average particle diameter of the metal cores of composite metal nanoparticles (small particles), average particle diameter d is the average particle diameter of metal nanofiller particles (medium particles), and average particle diameter D is the average particle diameter of metal filler particles (large particles). When three large particles are placed so that they contact mutually (closest packed triangle placement), a three pocket (central gap) is formed in the center. It is proven that the diameter of a first inscribed circle placed in the three pocket so that it is inscribed in three said large particles becomes $(2/\sqrt{3}-1)D$. Therefore, it is understood that when diameter d of a medium particle is smaller than the diameter of said inscribed circle, that is to say, when the condition equation of $d \leq (2/\sqrt{3}-1)D$ is satisfied, the medium particle can be inserted into said three pocket. Furthermore, it is proven that the diameter of a second inscribed circle inscribed in a minute gap formed between said inscribed circle and three said large particles becomes $[\frac{1}{3}-2/\{3(2\sqrt{3}-1)\}]D$. Therefore, it is understood that when diameter X of a small particle is smaller than the diameter of said second inscribed circle, that is to say, when the condition equation of $X[\frac{1}{3}-2/\{3(2\sqrt{3}-1)\}]D$ is satisfied, the small particle can be inserted into said minute gap. When the average particle diameters of the three particles of large, medium, and small size are set so that they satisfy these two conditions, the metal layer formed by firing easily comprise the closest packing structure, and even if it is not closest packed, the structure easily becomes close to the closest packed structure. Therefore, there is an advantage that a compact metal layer can be formed. As a result, it has an effect that it can freely form a metal layer of high electric conductivity, heat conductivity, and bond strength. Moreover, because D, d, X are average particle diameters, minute ultrafine particles are present in a large quantity. A metal layer is formed so that the group of these ultrafine particles fills the remaining gaps, and it became possible to maximally increase the compact degree of the metal layer.

According to the fifth form of the present invention, a composite nanometal paste, to which a solvent and/or a viscosity imparting agent is added, can be provided. Said solvent is a material that disperses and makes a solution out of three metallic component particles used in the present invention, and for example, alcohol, acetone, toluene, xylene, propanol, ether, petroleum ether, benzene and such can be used. Said viscosity imparting agent is a material that is added to said solution and imparts viscosity so that it becomes easy to apply, and for example, oil of turpentine, terpineol, methyl cellulose, ethyl cellulose, butylal, various terpene derivatives, IBCH (isobornyl cyclohexanol), glycerin, and an alcohol longer than or equal to C14 that is solid at room temperature can be used, among others. For terpene derivative, there are 1,8-terpine monoacetate and 1,8-terpine diacetate. IBCH is rosin-like, glycerin is syrup-like, and an alcohol longer than or equal to C14 has a property to change between solid and liquid states, and is non-fluid at 10° C. When three metallic component particles of the present invention are mixed and dispersed in said non-fluid viscosity imparting agent to form a non-fluid paste, an aggregation between the three metallic component particles does not occur, because the composite silver nanoparticles are fixed in a dispersed state at a low temperature of less than or equal to 10° C. If said non-fluid paste is heated just before use, it becomes fluid and becomes possible to be applied as a paste, so that it can achieve a function as a paste. Also, needless to say, if said solvent is added to said non-fluid paste just before use, it becomes a fluid paste even without heating, so that it can achieve a function as a paste.

In a composite nanometal paste of the present invention, it is desirable that the evaporating temperature or the decomposition temperature of said solvent and/or viscosity imparting agent is as low as possible. Therefore, the firing temperature of a paste is decided not only by the metalization temperature of the composite silver nanoparticle, but it also depends on the evaporating temperature or the decomposition temperature of the solvent and the viscosity imparting agent. Also, it is necessary for it to gasify by evaporation or decomposition through an application of heat, and materials that carbonize and remain are excluded. Also, as usage embodiments, a paste to which only solvent has been added, a paste to which only viscosity imparting agent has been added, and a paste to which both solvent and viscosity imparting agent have been added, can be used.

According to the sixth embodiment of the present invention, a composite nanometal paste can be provided, in which paste metalization temperature Tp3 (° C.) is less than or equal to 300° C. when said composite nanometal paste is thermally analyzed under atmosphere at temperature increase rate VT=1° C./min. When a composite nanometal paste is put through differential thermal analysis (DTA) under atmosphere, the organic coating layer of composite metal nanoparticle is oxidized, heat of reaction is generated, and a large DTA peak is formed. When this DTA peak comprises a single peak, the temperature at which this single peak ends is paste metalization temperature Tp3 (° C.). When said DTA peak comprises multiple peaks, the temperature at which the final peak ends is paste metalization temperature Tp3 (° C.). When the final peak is a steep peak, because there is nearly no difference between the steep peak temperature and its end temperature, either is preferable, but here, it is defined as the final peak temperature. From the point of view of thermogravimetry (TG), the decrease end temperature of a TG curve corresponds to said paste metalization temperature Tp3 (° C.). According to the present invention, because said paste metalization temperature Tp3 is less than or equal to 300° C., it becomes possible for the composite nanometal paste to undergo a firing at a low temperature. If temperature increase rate VT at the time of a DTA measurement becomes large, said temperature Tp3 increases, but in the present invention, paste metalization temperature Tp3(° C.) as measured at VT=1° C./min is less than or equal to 300° C.

The composite nanometal paste of the present invention contains composite metal nanoparticles whose metalization temperature T3 is T3≦200° C. when measured at 1° C./min, and as a result, as a whole of the paste, it became possible to set paste metalization temperature Tp3(° C.) at 1° C./min to 300° C. or less. Because paste metalization temperature Tp3 is less than or equal to 300° C. at 1° C./min, the cost of manufacturing apparatuses and production facilities can also be largely reduced. Therefore, the composite silver nanopaste of the present invention could be applied to various uses such as electronic materials such as bond materials, printed wiring, and electroconductive materials; magnetic materials such as magnetic storage media, electromagnetic wave absorbers, and electromagnetic wave resonators; structural materials such as far infrared materials and composite coating formation materials; ceramic or metallic materials such as sintering aids and coating materials; and medical materials.

According to the seventh embodiment of the present invention, a composite nanometal paste can be provided, in which paste metalization temperature Tp3 (VT) satisfies Tp3(VT)<Tp3(1° C./min)+100, where a unit of temperature is ° C., when said composite nanometal paste is thermally analyzed under atmosphere at temperature increase rate VT=1-20° C./min. The seventh embodiment signifies that even if temperature increase rate VT is varied within 1-20° C./min, paste metalization temperature Tp3(VT) does not increase to 100° C. more than paste metalization temperature Tp3(1° C./m in) at 1° C./min. Because it is Tp3(1° C./min)<300° C. from the sixth embodiment, it is clear that Tp3(VT)<400° C. according to the present invention. As thus described, by being able to set paste metalization temperature Tp3 (VT) low, it becomes possible to sinter a paste layer into a metal layer by a low temperature firing. By using composite metal nanoparticles whose paste metalization temperature Tp3 (1° C./min) is as low as possible, a low temperature firing becomes possible. In particular, if the composite silver nanoparticles that are developed by the present inventors are used, this low temperature firing can be realized.

According to the eighth embodiment of the present invention, a composite nanometal paste can be provided, in which paste metalization temperature Tp3 (VT) satisfies Tp3(VT)<Tp3(1°/min)+100, where a unit of temperature is ° C., when said composite nanometal paste is thermally analyzed under atmosphere at temperature increase rate VT=1-20° C./min. Said paste decomposition start temperature Tp1(VT) can be measured with the decrease start temperature of a TG curve, but, when a TG curve decreases linearly from the beginning and then departs from the straight line and decreases in a quadratic curve, the variation point, that is to say, the departure point from the straight line, can be defined as paste decomposition start temperature Tp1(VT). The straight-line region can be understood as the decrease region of a pure alcohol component. When a differential curve of a TG curve, that is to say, a DTG curve is used, the temperature in which the DTG curve begins to fall from a constant value may be defined as paste decomposition start temperature Tp1 (VT). Paste decomposition temperature Tp2 (VT), in which the organic coating layer strongly degrades oxidatively, is defined by the DTA peak temperature when the DTA peak is a single peak, and by the earliest peak temperature when the DTA peak is a multiple peak. Whether or not this earliest peak gives the greatest peak depends from material to material. The inequality of Tp2(VT)−100<Tp1(VT)<Tp2(VT) signifies that within a range of temperature increase rate VT=1-20° C./min, paste decomposition start temperature Tp1 (VT) occurs beneath and within an extent of 100° C. It is one of the characteristics of the composite nanometal paste concerning the present invention.

According to the ninth embodiment of the present invention, a composite nanometal paste can be provided, in which, when said composite nanometal paste is thermally analyzed under atmosphere at temperature increase rate VT=1-20° C./min, paste decomposition start temperature Tp1 (VT), paste decomposition temperature Tp2(VT), and paste metalization temperature Tp3(VT) increase with an increase of said temperature increase rate VT, while satisfying a relation of Tp1(VT)<Tp2(VT)<Tp3 (VT), a unit of temperature being °

C. The definitions of paste decomposition start temperature Tp1 (VT), paste decomposition temperature Tp2(VT), and paste metalization temperature Tp3(VT) of composite nanometal paste of the present invention correspond to the definitions of decomposition start temperature T1(VT), decomposition temperature T2(VT), and metalization temperature T3(VT) of the composite silver nanoparticle of the present invention. However, in a composite nanometal paste of the present invention, a solvent and a viscosity imparting agent are added into composite silver nanoparticles of small and medium particles, and because of this, before the composite silver nanoparticles are oxidatively decomposed, removal and oxidative decomposition of the solvent and the viscosity imparting agent proceed beforehand. Therefore, in a TG and DTA curves, the curves for the solvent and the viscosity imparting agent precede, and then the curve of the composite silver nanoparticles follows. In other words, the first sudden decrease that appears in the TG curve forms the first deep valley in the DTG curve that is its differential curve, and the temperature in which this valley recovers, and the DTG curve becomes approximately 0, can be determined to be paste decomposition start temperature Tp1(VT). This Tp1(VT) gives the second decrease start temperature of the DT curve. After this paste decomposition start temperature Tp1(VT), a DTA peak appears in the DTA curve, and the first DTA peak temperature that appears at the beginning is paste decomposition temperature Tp2(VT). The steep final peak that appears at the end of the DTA peak is thought to be a release peak of the bond energy, in which the remaining uncovered silver cores bond together after the organic coating layer is oxidatively decomposed. This point in which the peak dips down for the last time and bends toward the horizontal direction is defined as paste metalization temperature Tp3(VT). These paste temperature satisfies an inequality of Tp1(VT)<Tp2 (VT)<Tp3(VT) with a range of temperature increase rate VT=1-20° C./min. Therefore, Tp2(VT)−100<Tp1(VT)<Tp2 (VT)<Tp3(VT) is established when combined with the eighth embodiment. While satisfying this inequality, as VT increases, Tp1(VT), Tp2(VT), Tp3(VT) also increase. Needless to say, these temperature increments depend upon the carbon number of the organic coating layer, and also, it is thought that they depend upon the silver core particle diameter to some extent.

According to the tenth embodiment of the present invention, a composite nanometal paste can be provided, in which said composite metal nanoparticle is thermally analyzed under atmosphere at temperature increase rate VT(° C./min), a unit of temperature being ° C., so that decomposition start temperature T1(VT), decomposition temperature T2(VT), along with metalization temperature T3(VT) of said composite metal nanoparticle are defined, and said composite nanometal paste is thermally analyzed under atmosphere at temperature increase rate VT (° C./min), so that when paste decomposition start temperature Tp1 (VT), paste decomposition temperature Tp2(VT), along with paste metalization temperature Tp3(VT) of said composite nanometal paste are defined, one or more of T1(VT)<Tp1 (VT)<T1(VT)+100, T2(VT)<Tp2(VT)<T2(VT)+100, T3(VT)<Tp3(VT)<T3 (VT)+100 are established. According to the studies of the present inventors, it was found that between T1, T2, T3 of composite silver nanoparticles (notated CnAgAL, n=1-12) and Tp1, Tp2, Tp3 of a composite nanometal paste (notated PCnAgAL, n=1-12), the following inequalities were approximately satisfied within a range of temperature increase rate VT=1-20(° C./min).

$$T1(VT) < Tp1(VT) < T1(VT) + 100 \quad (P7)$$

$$T2(VT) < Tp2(VT) < T2(VT) + 100 \quad (P8)$$

$$T3(VT) < Tp3(VT) < T3(VT) + 100 \quad (P9)$$

Through these inequalities, and by means of measuring characteristic temperatures T1, T2, T3 of the composite silver nanoparticles, characteristic temperatures Tp1, Tp2, Tp3 of the composite nanometal paste can be estimated.

According to the eleventh embodiment of the present invention, a method of bonding can be provided, in which the composite nanometal paste of any one of the first to tenth embodiments is provided, a paste layer is formed between a lower body and an upper body by said composite nanometal paste, and said lower body and said upper body are bonded by sintering said paste layer into a metal layer by application of heat. This embodiment is a method of bonding of two objects by the use of a composite nanometal paste. One object is termed a lower body, and the other object an upper body. Both are adhered through a paste layer then fired, and by conversion of the paste layer into a metal layer, a strong bonding can be achieved. Moreover, a metal film has a superior electrical conductivity, thermal conductivity, and bond strength, and because a low temperature firing is possible, a bonding between low melting objects also becomes possible.

According to the twelfth embodiment of the present invention, it is a method of bonding, in which a shear stress, that is to say, a bond strength, when said lower body and said upper body are sheared in a direction parallel to said metal layer, said lower body and said upper body being joined through said metal layer under no-load and inert gas, is greater than or equal to 10 (MPa). In addition, a state of no-load is a state in which only the self weight is applied, and no load is applied. According to studies of the present inventors, when a bonding body is put though various examinations of high temperature environment, low temperature environment, and long duration performance, and if the bond strength is less than or equal to 10 MPa, it is clear that the durability is not sufficient, and it would not be able to bear through a repetition performance test. However, when a bonding examination was done by using composite nanometal pastes of the present invention, it became clear that the bond strength stabilizes and becomes greater than 10 MPa. Therefore, by the present invention, in addition to high electrical and thermal conductivities, high bond strength can be imparted.

According to the thirteenth embodiment of the present invention, an electronic component produced by the method of bonding of the eleventh or twelfth embodiment can be provided. Because an electronic component provided by this embodiment has a high electrical conductivity, a high thermal conductivity, and a high bond strength, it has an outstanding service life, and a normal operation can be done stably even under a severe environment.

BRIEF DESCRIPTION OF THE DRAWINGS

FIG. 1 is an explanatory diagram of the first step of a low temperature production reaction of the composite silver nanoparticles concerning the present invention.
FIG. 2 is an explanatory diagram of the second step of a low temperature production reaction of composite silver nanoparticles concerning the present invention.
FIG. 7 is a figure of mutual relations of characteristic temperatures T1, T2, T3 of composite silver nanoparticles concerning the present invention.
FIG. 8 is a particle diameter relation figure of the three metallic components of a composite nanometal paste concerning the present invention.
FIG. 10 is a relation figure of average particle diameters X, d, D that satisfy the three pocket conditions.
FIG. 11 is a proving figure of the relations of average particle diameters d, D satisfying the three pocket conditions.
FIG. 12 is a proving figure of the relations of average particle diameters X, D satisfying the three pocket conditions.
FIG. 15 is a characteristic temperature figure of CnAgAL and PCnAgAL concerning the present invention.
FIG. 16 is an outlined schematic diagram of a bonding examination and a bond strength examination by a three metallic component type composite nanometal paste concerning the present invention.

BEST MODE FOR CARRYING OUT THE INVENTIONS

Figure 3:
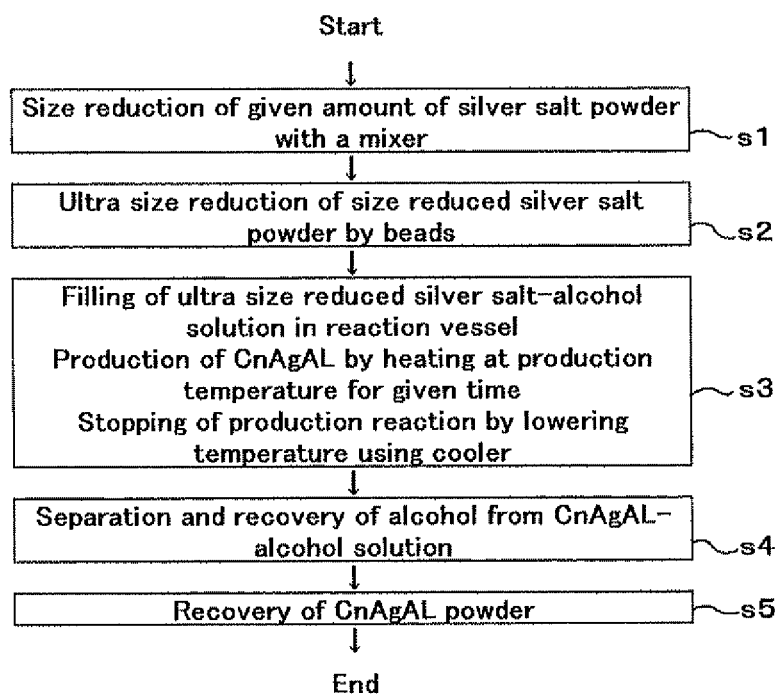
FIG. 3 is a flow diagram showing a low temperature production procedure of composite silver nanoparticles concerning the present invention.

In the following, embodiments of the composite silver nanoparticles, the manufacturing method, the composite nanometal paste, and the method of bonding concerning the present invention are explained in detail by figures and tables.

FIG. 1 is an explanatory diagram of the first step of a low temperature production reaction of the composite silver nanoparticles concerning the present invention. The inorganic compound to be a raw material is a silver salt (1). As for the silver salt, an inorganic silver salt and an organic silver salt can be used. As for inorganic silver salts, there are silver carbonate, silver chloride, silver nitrate, silver phosphate, silver sulfate, silver borate, and silver fluoride among others. Also, as for organic silver salts, there are fatty acid salts such as silver formate and silver acetate, silver sulfonate, and silver salts of hydroxy group, thiol group, and enol group, among others. Among these silver salts, silver salts comprising C, H, O, Ag, a silver salt comprising C, H, Ag, silver salts comprising H, O, Ag, silver salts comprising C, O, Ag, and silver salts comprising o, Ag are preferable in that they do not contain impurities. The reason is that, even when the silver salt is mixed as an impurity into generated composite silver nanoparticles, only $H_2O$, $CO_2$, $O_2$ and such are generated by the firing. In the embodiment of the present invention, silver carbonate $Ag_2CO_3$ is described below as a suitable silver salt, but, needless to say, other silver salts can be used similarly.

As for the alcohol, an alcohol shown in Equation (2) is used. $R_n$ of Equation (3) indicates the hydrocarbon group of the alcohol. Carbon number n is limited to 1-12. Normally, silver salt particles are insoluble in alcohol, but the hydrophilic group OH of alcohol has a property that it bonds easily with the surface of silver salt particles. Also, the hydrophobic group $R_n$ of alcohol has a high affinity with an alcohol solvent. Therefore, as shown in Equation (4), when silver salt particles are dispersed in an alcohol solvent, the alcohol adsorbs on the silver salt particle surface as to surround it, and they are suspended in the alcohol solution. When the particle diameter of silver salt particles is small, a stable silver salt particle colloid is formed. On the other hand, a precipitate can be formed when the particle diameter of silver salt particles is large, but this will not be a problem if the suspended condition is maintained for a few tens of minutes, and also, it may be reacted while stirred slowly.

FIG. 2 is an explanatory figure of the second step of a low temperature production reaction of composite silver nanoparticles concerning the present invention. In here, to make the reaction equation clear, silver carbonate is used in the explanation as the example of a silver salt, but it is similar even in cases of other silver salts. The silver carbonate of the silver carbonate particle surface reacts with the alcohol, and as shown in Equation (5), aldehyde $R_{n-1}CHO$ is produced simultaneously with the silverization. Also, as shown in Equation (6), a reaction path also exists, in which silver alkoxide $AgOR_n$ is generated directly without an aldehyde being formed. Said aldehyde has a strong reduction effect, and as shown in Equation (7), it reduces silver carbonate, and carboxylic acid $R_{n-1}COOH$ is formed simultaneously with the silverization. The intermediately produced Ag, $AgOR_n$, and $R_{n-1}COOH$ aggregate mutually by the reactions shown in Equation (8) and Equation (9), and composite silver nanoparticles are produced, in which the interior is Ag, and an alcohol originating organic coating layer such as alkoxide or carboxylate is provided on the surface. These composite silver nanoparticles are illustrated in Equations (10) and (11). Said reactions are surface reactions of the silver carbonate particles, and the reactions continue while gradually seeping from the surface to the inside, the silver carbonate particles that are central cores changing into silver cores. Ultimately, composite silver nanoparticles shown in Equations (10) and (11) are produced.

Equations (10) and (11) show constitutive formulas of the formed organic coating layer on the silver cores and their circumferences. Organic coating layer can be an alkoxide group $OR_n$, or can be a carboxylic acid $R_{n-1}COOH$. Of course, it can be a carboxylate group $R_{n-1}COO$ from which an H has detached from a carboxylic acid (fatty acid). Therefore, the organic coating layer can be an alkoxide, an alkoxide group, a carboxylic acid, a carboxylate group, or a mixed form thereof.

Table 1 shows the types, their mass, and the mole ratios of the excess alcohol solutions of the raw materials (silver carbonate and alcohol) for composite silver nanoparticles. Also, Table 2 shows the molecular weights of the raw materials for composite silver nanoparticles, and the mole number per 100 g. In correspondence with the carbon number, (the C number) n, the individual nomenclatures of the alcohol are shown. Embodiment 1 described below corresponds to n=1, Embodiment 2 to n=2, Embodiment 3 to n=3, Embodiment 4 to n=4, Embodiment 5 to n=5, Embodiment 6 to n=6, Embodiment 7 to n=7, Embodiment 8 to n=8, Embodiment 9 to n=9, Embodiment 10 to n=10, Embodiment 11 to n=11, and Embodiment 12 to n=12.

As shown in previous Equation (6), in a gas reaction of silver carbonate and alcohol, the stoichiometric ratio is silver carbonate: alcohol=1 mol: 2 mol. However, as shown in Table 1, in the present invention, silver carbonate has to be dispersed into to an excess alcohol. This is to decrease the collision probability of the composite silver nanoparticles produced, and prevent an aggregation of the composite silver nanoparticles. As shown in Table 1, in Embodiments 1 to 12, the mole ratio is set to a range of alcohol mole number/silver carbonate mole number=10 to 63.9, and made to be an excess alcohol solution. Because this mole ratio becomes more optimal as it increases, it can be raised to mole ratio=10 to about 200. Even silver salts other than silver carbonate are adjusted to excess alcohol solution. Tables 1 and 2 are as follows.

TABLE 1

Mass of Raw Materials of Composite Silver Nanoparticles (Silver Carbonate and Alcohol) and Mole Ratio of Excess Alcohol Solutions

| No. | Number of Carbons | Ag2CO3 Mass | Ag2CO3 Mole Number | Alcohol Raw Material | Alcohol Mass | Alcohol Mole Number | Mole Ratio | Denotation of Composite Nanosilver Particles |
|---|---|---|---|---|---|---|---|---|
| Embodiment 1 | 1 | 100 g | 0.363 mol | CH3OH | 116 g | 3.63 mol | 10.0 | C1AgAL |
| Embodiment 2 | 2 | 100 g | 0.363 mol | C2H5OH | 167 g | 3.63 mol | 10.0 | C2AgAL |
| Embodiment 3 | 3 | 100 g | 0.363 mol | C3H7OH | 873 g | 14.52 mol | 40.0 | C3AgAL |
| Embodiment 4 | 4 | 100 g | 0.363 mol | C4H9OH | 269 g | 3.63 mol | 10.0 | C4AgAL |
| Embodiment 5 | 5 | 100 g | 0.363 mol | C5H11OH | 1280 g | 14.52 mol | 40.0 | C5AgAL |
| Embodiment 6 | 6 | 100 g | 0.363 mol | C6H13OH | 2300 g | 23.2 mol | 63.9 | C6AgAL |
| Embodiment 7 | 7 | 100 g | 0.363 mol | C7H15OH | 2531 g | 21.78 mol | 60.0 | C7AgAL |
| Embodiment 8 | 8 | 100 g | 0.363 mol | C8H17OH | 880 g | 6.8 mol | 18.7 | C8AgAL |
| Embodiment 9 | 9 | 100 g | 0.363 mol | C9H19OH | 3142 g | 21.78 mol | 60.0 | C9AgAL |
| Embodiment 10 | 10 | 100 g | 0.363 mol | C10H21OH | 2200 g | 14.0 mol | 38.6 | C10AgAL |
| Embodiment 11 | 11 | 100 g | 0.363 mol | C11H23OH | 3753 g | 21.78 mol | 60.0 | C11AgAL |
| Embodiment 12 | 12 | 100 g | 0.363 mol | C12H25OH | 1120 g | 6.0 mol | 16.5 | C12AgAL |

TABLE 2

Molecular Weight of Raw Materials for Composite Nanosilver Particles

| Number of Carbon C | Name of Raw Material | Raw Material | Molecular Weight | Mole Number Per 100 g |
|---|---|---|---|---|
| 1 | Silver Carbonate | Ag2CO3 | 275.744 | 0.363 |
| | Methanol | CH3OH | 32.042 | 3.121 |

TABLE 2-continued

Molecular Weight of Raw Materials for Composite Nanosilver Particles

| Number of Carbon C | Name of Raw Material | Raw Material | Molecular Weight | Mole Number Per 100 g |
|---|---|---|---|---|
| 2 | Ethanol | C2H5OH | 46.069 | 2.171 |
| 3 | Propanol | C3H7OH | 60.096 | 1.664 |
| 4 | Butanol | C4H9OH | 74.123 | 1.349 |
| 5 | Pentanol | C5H11OH | 88.150 | 1.134 |
| 6 | Hexanol | C6H13OH | 102.177 | 0.979 |
| 7 | Heptanol | C7H15OH | 116.203 | 0.861 |
| 8 | Octanol | C8H17OH | 130.230 | 0.768 |
| 9 | Nonanol | C9H19OH | 144.257 | 0.693 |
| 10 | Decanol | C10H21OH | 158.284 | 0.632 |
| 11 | Undecanol | C11H23OH | 172.311 | 0.580 |
| 12 | Dodecanol | C12H25OH | 186.338 | 0.537 |

FIG. 3 is a flow diagram showing a low temperature production procedure of composite silver nanoparticles concerning the present invention. In Step s=1, a commercial silver salt of specified quantity is size-reduced with a mixer. Even though average particle diameter of commercial silver salt is 10 μm, the variation is extremely large. In Step s=2, the size-reduced silver salt powder is ultra size-reduced with beads, so that it is made uniform with an approximate particle diameter of 10 nm. The relation with the beads particle diameter and the silver salt ultra size-reduced particle diameter is described below in Table 3. In Step the ultra size-reduced silver salt is dispersed in an alcohol of excess amount. This alcohol solution is filled in a reactor, and composite silver nanoparticles (CnAgAL) are produced by heating only up to a predetermined time (reaction time) at a production temperature (reaction temperature). After the time elapse, the production reaction is stopped by promptly lowering the temperature with a cooler. In Step s=4, the alcohol is separated and collected from CnAgAL alcohol solution, and the CnAgAL powder is collected in Step s=4.

Table 3 is a relation table between the beads particle diameter and the ultra size-reduced particle diameter of the silver salt including Ag2CO3. The smaller the beads particle diameter is, the smaller becomes the ultra size-reduced particle diameter, and the particle diameter of CnAgAL produced by the previous also becomes smaller. The beads particle diameters of 1 mm-0.03 mm exist, and thus the ultra size-reduced particle diameter can be controlled freely to a range of 5000 nm-10 nm.

TABLE 3

Particle diameter of raw material silver salt: 10 μm, with size distribution
Particle diameter of silver salt size-reduced through a mixer: uniform 10 μm Ultra size-reduction treatment of size-reduced silver salt by beads
Circular movement through 2000 rpm revolution and 800 rpm rotation

| Beads diameter (mm) | Circumvolution time (min) | Particle diameter of ultra size-reduced silver salt (nm) |
|---|---|---|
| 0.03 | 5 | 10 |
| 0.05 | 5 | 50 |
| 0.1 | 5 | 200 |
| 0.2 | 5 | 800 |
| 0.5 | 5 | 2000 |
| 1 | 5 | 5000 |

Embodiments 1-12: C1AgAL-C12AgAL

Table 4 is a list of the production conditions (reaction conditions) of composite silver nanoparticles C1AgAL-C12AgAL of C1-C12 and the particle structures. As the carbon number increases from C1 to C12, the production time is shortened from 300 minutes to 20 minutes, and conversely, the production temperature increases from 40° C. to 151° C. Also, the average particle diameter X (nm) of the metal core decreases from 51 to 10, and the average particle diameter X shows a tendency to become larger as the C number becomes smaller. The particle size distribution tends to become smaller as the C number increases, but even at the maximum distribution, it is smaller than 100 nm. The maximum of the distribution becomes smaller when the production time is made shorter. Furthermore, metal content percentage becomes smaller as the C number increases, but even at the minimum, it shows a high value of 91.8%. This signifies that the organic matter content percentage conversely increases with the C number. What is particularly remarkable is the fact that, for example, even if the metal core average particle diameter of C1AgAL is X=51 nm, the distribution is distributed broadly to 10-89 nm, and considerably small ultrafine particles smaller than average particle diameter are contained in a large quantity. In the present invention, as previously described, the range of the average particle diameter was decided by the three pocket condition. However, because ultrafine particles considerably smaller than the average particle diameter exist in large quantities, a group of these ultrafine particles is embedded into the small gaps of three pockets, and it becomes a reason that a metal layer formed by sintering is made compact. These conditions are facts common to all composite silver nanoparticles.

TABLE 4

Production Conditions and Particle Structures of Composite Silver Nanoparticles

| No. | C Number | Production Time | Production Temperature PT | Metal Core Average Particle Diameter X | Metal Core Particle Diameter Distribution | Metal Content Percentage | Organic Content Percentage |
|---|---|---|---|---|---|---|---|
| Embodiment 1 | 1 | 300 (min) | 40 (° C.) | 51 (nm) | 10~89 (nm) | 98.2 (%) | 1.8 (%) |
| Embodiment 2 | 2 | 240 | 78 | 46 | 8.7~83 | 97.6 | 2.4 |
| Embodiment 3 | 3 | 180 | 97 | 42 | 5.6~79 | 96.9 | 3.1 |
| Embodiment 4 | 4 | 120 | 117 | 37 | 4.0~72 | 96.3 | 3.7 |
| Embodiment 5 | 5 | 60 | 120 | 34 | 3.2~65 | 95.7 | 4.3 |
| Embodiment 6 | 6 | 40 | 110 | 32 | 2.3~63 | 95.2 | 4.8 |
| Embodiment 7 | 7 | 38 | 132 | 28 | 2.1~54 | 94.7 | 5.3 |
| Embodiment 8 | 8 | 33 | 148 | 24 | 2.0~48 | 94.1 | 5.9 |
| Embodiment 9 | 9 | 30 | 110 | 21 | 2.0~43 | 93.5 | 6.5 |
| Embodiment 10 | 10 | 26 | 140 | 17 | 1.8~32 | 92.9 | 7.1 |
| Embodiment 11 | 11 | 23 | 148 | 13 | 1.7~25 | 92.3 | 7.7 |
| Embodiment 12 | 12 | 20 | 151 | 10 | 1.5~18 | 91.8 | 8.2 |

Figure 4:
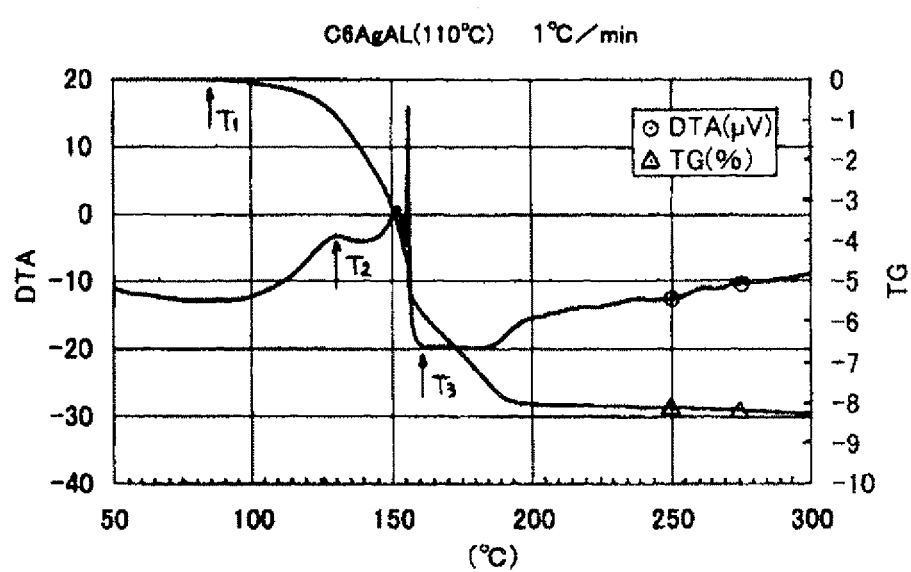
FIG. 4 is a thermal analysis graph of C6AgAL produced at 110° C. concerning the present invention (temperature increase rate: 1° C./min).

FIG. 4 is a thermal analysis graph in which C6AgAL (Embodiment 6) produced at 110° C. is thermally analyzed at a temperature increase rate of 1° C./min. T1 indicates the decomposition start temperature, T2 the metalization temperature (silverization temperature), and T3 the decomposition temperature. Decomposition start temperature T1 is defined by the TG decrease start temperature, but it can also be defined by the DTA increase start temperature. Decomposition temperature T2 is defined by the earliest peak temperature (first peak temperature). There are two peaks in this DTA, and because the maximum peak is the second peak, the maximum peak temperature does not necessarily give decomposition temperature T2. The present inventors currently think that the first peak corresponds to the decomposition temperature of minute particles in the composite silver nanoparticles, and the second peak corresponds to the decomposition temperature of larger particles or aggregated particles within the composite silver nanoparticles. Metalization temperature T3 is defined by the end temperature of the last peak, but when the last peak is a steep peak, defining with the steep peak temperature does not cause much difference. This last peak is thought to give the temperature in which the silver cores of said minute particles, large particles, and aggregated particles that have become uncovered move mutually, to form a compact metal layer (silver layer). As a result, T1=85° C., T2=129° C., T3-160° C. were obtained.

Table 5 is a relational table of characteristic temperatures T1, T2, T3, PT of composite silver nanoparticles, alcohol boiling temperature BT, and carbon number. Characteristic temperatures T1, T2, T3 were measured on CnAgAL (n=1-12) of Embodiments 1-12, by doing the same thermal analysis as in FIG. 4, at a temperature increase rate of 1° C./min. Production temperature PT is set at a temperature less than or equal to boiling point BT of the corresponding alcohol. Metalization temperature T3 varies between 117-198° C., but T3≦200° C. is established, and it is shown that the present invention can utilize composite silver nanoparticles that can be fired at low temperature. From this table, it was demonstrated that T1<T2<T3, PT<T3, and T3≦200° C. are established.

Figure 5:
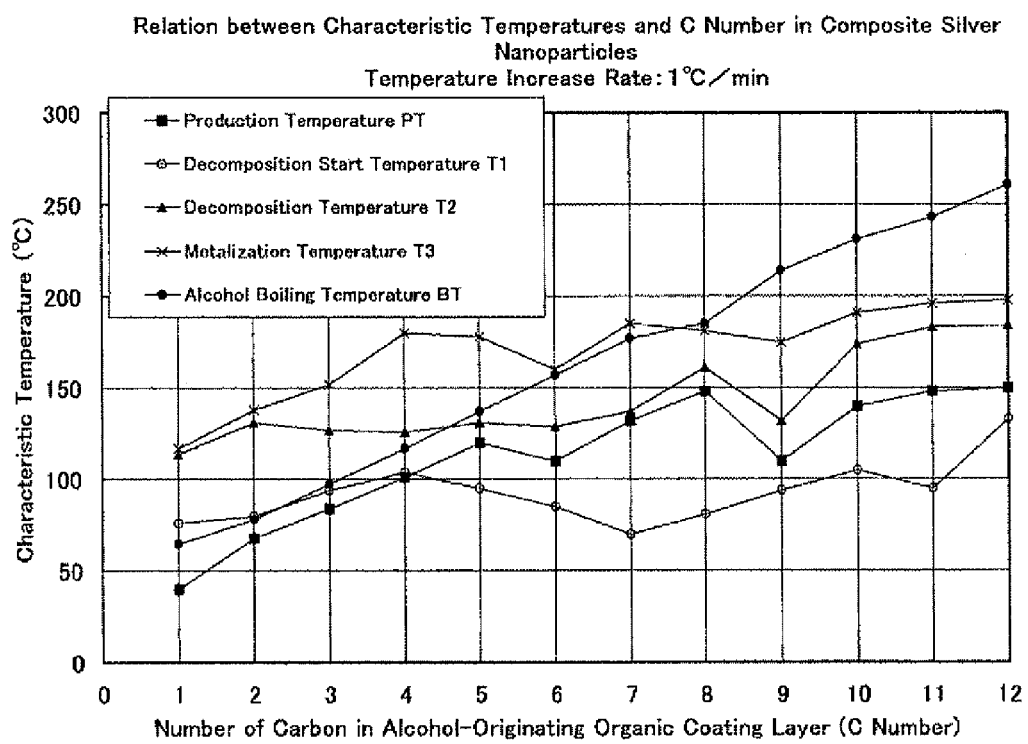
FIG. 5 is a relational graph between characteristic temperatures T1, T2, T3, PT and the C numbers of composite silver nanoparticles concerning the present invention, at a temperature increase rate of 1° C./min.

FIG. 5 is a relational graph between the characteristic temperatures and the C numbers of composite silver nanoparticles. This FIG. 5 is a graphic representation of PT, T1, T2, T3, and BT shown in Table 6 against the C number. Also from this graph, it is shown that T1<T2<T3, PT<T3, and T3≦200° C. are established.

Table 6 is a relational table between the C number and T1 shown in Table 5, and it is a relational table that proves T2−100≦T1≦T2 is established. Its third to fifth rows show the values of T2−100, T1, and T2. Clearly, an inequality of T2−100 T1≦T2 is established.

TABLE 6

Range of Decomposition Start Temperature T1 of Composite Silver Nanoparticles (Temperature Increase Rate: 1° C./min)
T2 − 100 ≦ T1 ≦ T2

| Embodiment No. | C Number | T2 − 100 (° C.) | Decomposition Temperature Start T1 (° C.) | Decomposition Temperature T2 (° C.) |
|---|---|---|---|---|
| Embodiment 1 | 1 | 14 | 76 | 114 |
| Embodiment 2 | 2 | 31 | 80 | 131 |
| Embodiment 3 | 3 | 27 | 94 | 127 |
| Embodiment 4 | 4 | 26 | 104 | 126 |
| Embodiment 5 | 5 | 31 | 95 | 131 |
| Embodiment 6 | 6 | 29 | 85 | 129 |
| Embodiment 7 | 7 | 37 | 70 | 137 |
| Embodiment 8 | 8 | 61 | 81 | 161 |
| Embodiment 9 | 9 | 32 | 94 | 132 |
| Embodiment 10 | 10 | 74 | 105 | 174 |
| Embodiment 11 | 11 | 83 | 95 | 183 |
| Embodiment 12 | 12 | 84 | 133 | 184 |

Figure 6:
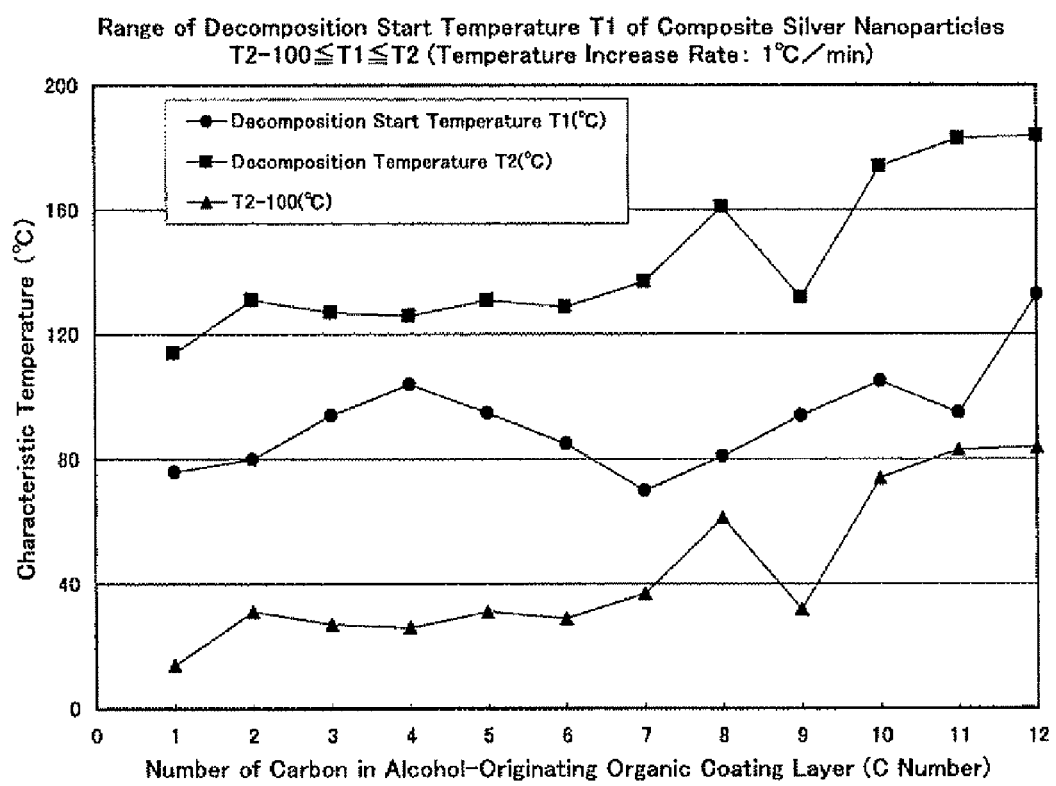
FIG. 6 is a temperature range graph of decomposition start temperature T1 of composite silver nanoparticles concerning the present invention, at a temperature increase rate of 1° C./min.

FIG. 6 is a graphic representation of Table 6, and it is a range figure of decomposition temperature T1 of composite silver nanoparticles. It is illustrated that decomposition start temperature T1 exists beneath decomposition temperature T2, within 100° C. As for numerical formula, a relation of T2−100≦T1≦T2 is proved. This relational equation became

TABLE 5

Relation between Characteristic Temperatures PT, T1, T2, T3, BT (° C.) of Composite Silver Nanoparticles and Carbon Number
(Temperature Increase Rate: 1° C./min)

| No. | C Number | Production Temperature PT | Decomposition Start Temperature T1 | Decomposition Temperature T2 | Metalization Temperature T3 | Alcohol Boiling Temperature BT |
|---|---|---|---|---|---|---|
| Embodiment 1 | 1 | 40 | 76 | 114 | 117 | 64.7 |
| Embodiment 2 | 2 | 68 | 80 | 131 | 138 | 78.3 |
| Embodiment 3 | 3 | 84 | 94 | 127 | 152 | 97.4 |
| Embodiment 4 | 4 | 101 | 104 | 126 | 180 | 117 |
| Embodiment 5 | 5 | 120 | 95 | 131 | 178 | 137 |
| Embodiment 6 | 6 | 110 | 85 | 129 | 160 | 157 |
| Embodiment 7 | 7 | 132 | 70 | 137 | 185 | 177 |
| Embodiment 8 | 8 | 148 | 81 | 161 | 181 | 185 |
| Embodiment 9 | 9 | 110 | 94 | 132 | 175 | 214 |
| Embodiment 10 | 10 | 140 | 105 | 174 | 191 | 231 |
| Embodiment 11 | 11 | 148 | 95 | 183 | 196 | 243 |
| Embodiment 12 | 12 | 150 | 133 | 184 | 198 | 261 | first known with the present invention, and the property of the characteristic temperatures of composite silver nanoparticles is provided.

FIG. 7 is a figure of mutual relations of characteristic temperatures T1, T2, T3 of composite silver nanoparticles concerning the present invention. Characteristic temperatures T1, T2, T3 obtained in the present invention are summarized. The composite silver nanoparticles obtained in the present invention are C1AgAL-C12AgAL. The following matter became known by thermally analyzed them under atmosphere and measuring TG and DTA curves. Decomposition start temperature T1 (° C.) can be defined by the TG decrease start temperature or the DTA increase start temperature. Decomposition temperature T2 (° C.) is the DTA peak temperature. It is defined with the beginning peak temperature in a case that multiple peaks are comprised, but it may be defined with the DTA maximum peak temperature. Silverization temperature (metalization temperature) T3 (° C.) is defined by the DTA final peak temperature, but it may be defined with the DTA final peak ending temperature, and it is defined as the TG stabilizing temperature from a TG curve. Also, PT (° C.) is the production temperature (reaction temperature) of composite silver nanoparticles.

By thermally analyzing at temperature increase rate VT=1° C./min, facts of Equations (C1)-(C2) was obtained. In Equation (C1) it becomes T1<T2<T3, and the decomposition start temperature, the decomposition temperature, and the metalization temperature increase in this order. In Equation (C2) it becomes T2−100<T1<T2, and the decomposition start temperature exists below and within 100° C. of the decomposition temperature. In Equation (C3), T3≦200° C. is established. The silverization temperature (metalization temperature) of composite silver nanoparticles of the present invention is less than or equal to 200° C., and the sintering temperature can be set at a low temperature. Also, because it is PT<T3 in Equation (C4), it is a fact that composite silver nanoparticles can be produced at a reaction temperature less than or equal to the metalization temperature. In the present invention, these facts were obtained. Furthermore, temperature increase rate VT was inceased, and relation of equations (C5)-(C7) were confirmed within a range of 1(° C./min) ≦VT≦20 (° C./min). In Equation (C5), T1(VT)<T2(VT)<T3 (VT) is obtained, and the relation of Equation (C1) is established at an arbitrary temperature increase rate VT. Also, in Equation (C6), T2(VT)−100<T1(VT)<T2(VT) is obtained, and the relation of Equation (C2) is established at an arbitrary temperature increase rate VT. Furthermore, in Equation (C7), T3(VT)<T3(1° C./min)+100 is obtained, and the metalization temperature at an arbitrary temperature increase rate VT does not increase by 100° C. or more than the metalization temperature at VT=1 (° C./min).

Table 7 is a relation table showing the production conditions and the particle structure of silver nanofiller particles.

The present inventors thought that when a nanometal paste is made with the use of composite silver nanoparticles, a nanometal paste of three metallic component type will achieve the highest compacting of a metal layer. When gaps of silver filler particles with a particle diameter of 100 nm or more (large particles) are filled by silver nanofiller particles with a particle diameter of 100 nm or less (medium particles), and furthermore, the remaining gaps are filled with minute composite silver nanoparticles (small particles), a compact metal layer should be formed, and a nanometal paste with superior electrical/heat/mechanical strength characteristics should be provided. Silver filler particles with a particle diameter of 100 nm or more (large particles) are sold commercially, and it is not necessary to develop them. As for silver nanofiller particles with a particle diameter of 100 nm or less, they are difficult to obtain as a commercially available product. This is because the particle diameter is small, and also because a production method of a pure silver nanofiller is not established. Therefore, the present inventors thought it is certain that when the production condition of composite silver nanoparticles is used, and it is reacted at a higher temperature for a long time, the composite silver nanoparticles aggregate mutually, and at the same time, the metal core of one composite silver nanoparticle becomes larger. The detail is shown in Table 7.

TABLE 7

Production Conditions and Particle Structures of Silver Nanofiller Particles

| No. | C Number | Production Time | Production Temperature PT | Metal Core Avg. Particle Diameter d | Metal Core Particle Diameter Distribution | Metal Content Percentage | Organic Content Percentage | Alcohol Boiling Temperature BT |
|---|---|---|---|---|---|---|---|---|
| Embodiment 22 | 2 | 20 (h) | 78 (° C.) | 92 (nm) | 71~105 (nm) | 99.9 (%) | 0.1 (%) | 78.3 (° C.) |
| Embodiment 24 | 4 | 18 | 116 | 75 | 52~98 | 99.8 | 0.2 | 117 |
| Embodiment 26 | 6 | 15 | 155 | 57 | 38~82 | 99.8 | 0.2 | 157 |
| Embodiment 28 | 8 | 10 | 180 | 34 | 18~52 | 99.6 | 0.4 | 185 |
| Embodiment 30 | 10 | 7 | 185 | 24 | 18~31 | 99.5 | 0.5 | 231 |

As it can be seen from Embodiments 22-30, the production of composite silver nanoparticles was done by setting the production time (reaction time) at a long time from 20 hours to 7 hours, and furthermore, increasing the production temperature (reaction temperature) up to alcohol boiling temperature BT. As a result, metal core average particle diameter d can be increased to 92-24 nm, and it was found that the metal core particle size distribution became narrower than in Embodiments 1-12. Organic coating layer becomes extremely thin, organic content percentage is only 0.1-0.5%, and metal content percentage increases up to 99.9-99.5%. When Table 7 is compared to Table 4, it is found that the metal core average particle diameter has increased, and the particle size distribution has narrowed. Therefore, in the following, it was decided to use the particles described in Table 4 as composite silver nanoparticles, and use the composite silver nanoparticles described in Table 7 as silver nanofiller particles.

FIG. 8 is a particle diameter relation figure of the three metallic components of a composite nanometal paste concerning the present invention. The composite nanometal paste of the present invention is composed of three types of metallic components. The first particles are composite metal nanoparticles NS on which an organic coating layer is formed at the circumference of a metal core of average particle diameter X (nm) (described in Table 4), and these become small particles. The second particles are metal nanofiller particles NF of average particle diameter d (nm), and these become medium particles. Two types of these metal nanofiller particles NF exist. The first type is composite metal nanoparticles of metal core average particle diameter d (nm) (described in Table 7), and the second type is metal nanoparticles of average particle diameter d (nm). Either may be used, but the first type, composite metal nanoparticles (described in Table 7), is used in the following embodiments. The third particles are metal filler particles F of average particle diameter D (nm), and this corresponds to large particles. Commercial silver particles are used. For these large particles, medium particles, small particles to fill the gaps mutually, particle diameter conditions, first relation of Equation (12), X<d<D, and the second relation of Equation (13), X<d<100 nm, are necessary. Generally, D≧100 nm will be necessary. If it is a composite nanometal paste that contains three types of metallic components that satisfy the above conditions, when it is fired after forming a paste layer, it sinters so that the gaps are filled with the three types of metal particles, and a compact metal film can be formed. Therefore, a metal layer having high electric conductivity, high heat conductivity, and high bond strength is formed by this three metallic component type composite nanometal paste. In particular, bond strength greater than or equal to 10 MPa can be realized.

Figure 9:
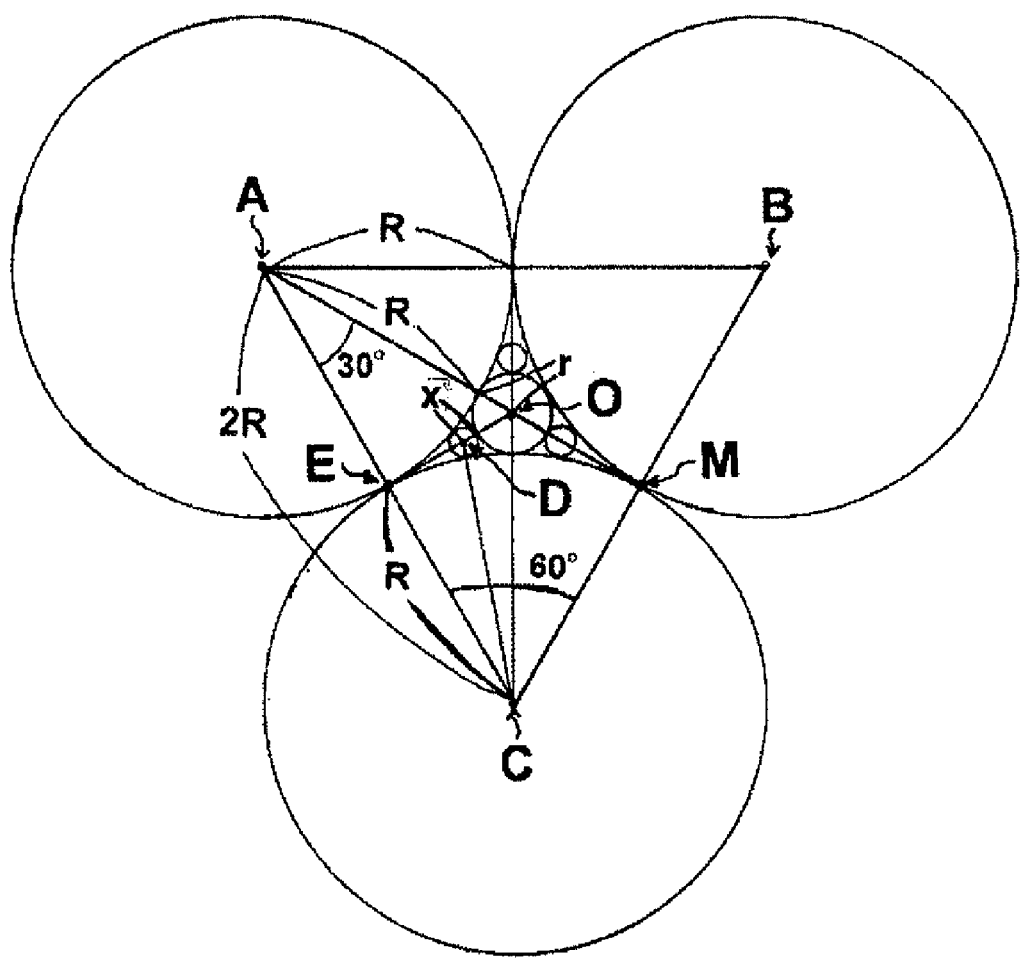
FIG. 9 is a diagram of a three pocket of the three types of metallic components in a composite nanometal paste concerning the present invention.

FIG. 9 is a diagram of a three pocket of the three types of metallic components in a composite nanometal paste concerning the present invention. In the present invention, to increase furthermore the filling rate of the three types of metal particles, the three pocket theory is applied concretely. That is to say, three metal filler particles F are placed in a contacting condition on a plane (plane closest packing placement). The gap at the center becomes three pocket P. In this three pocket P, first inscribed circle NFmax inscribed in said three metal filler particles F is formed, and radius r of this first inscribed circle NFmax is determined. If particle diameter d of said metal nanofiller particle NF satisfies d≦2r, metal nanofiller particle NF is expected to fill three pocket P. Furthermore, radius x of a second inscribed circle inscribed to a minute differential gap, formed by metal filler particles F and inscribed circle NFmax, is determined. For a composite metal nanoparticle NS with metal core average particle diameter X to fill the minute differential gap, it is sufficient that X≦2x is satisfied.

FIG. 10 is a relation figure of average particle diameters X, d, D that satisfy the three pocket conditions. Equations (12) and (13) are the first and second relations of FIG. 8. A matter of FIG. 10 that is not shown in FIG. 8 are the third relation of Equations (14) and (15), and the fourth relation of Equations (16) and (17), and this will be explained. As mentioned earlier, Equation (14) is derived from the condition of d≦2r. When its coefficient is evaluated concretely, Equation (15) is obtained. Therefore, Equations (14) and (15) are substantially the same. Also, as stated above, Equation (16) is derived from the condition of X≦2x. When its coefficient is processed and evaluated concretely, Equation (17) is obtained. Therefore, Equations (16) and (17) are substantially the same. Therefore, Equations (14)-(17) described again here. In the following, the proof is done.

$$d \leq (2/\sqrt{3}-1)D \quad (14)$$

$$d \leq 0.1547D \quad (15)$$

$$X \leq [\tfrac{1}{3} - 2/\{3(2\sqrt{3}-1)\}]D \quad (16)$$

$$X \leq 0.06278D \quad (17)$$

FIG. 11 is a proving figure of the relations of average particle diameters d, D satisfying the three pocket conditions. Three metal filler particles F with radius R come into contact mutually on a plane, and the closest packed placement is achieved. Right then, because the particle diameter is replaced with radius R, Equation (18) of D=2R is established. Because particle diameter d of metal nanofiller particle NF is smaller than first inscribed circle NFmax, Equation (19) of d≦2r is established. Next, this radius r is determined. Referring to FIG. 9, when the centers of three metal filler particles F are enumerated A, B, C, point O is the center of gravity of equilateral triangle ABC. Because AM is divided internally into 2:1 by point O, Equation (20) is established. When Equation (20) is expressed using radii R, r, it becomes Equation (21). When this equation is solved for r, Equation (22) is obtained. When it is evaluated, Equation (23) is obtained. From the condition of Equation (19), that is to say, d≦2r, Equations (25) and (26) are established. Equations (25) and (26) are a previously described Equations (14) and (15). When this conclusion is described by words, it becomes, "It is necessary for average particle diameter d of nanofiller particles NF to be less than or equal to 0.1547 times average particle diameter D of metal filler particle F."

FIG. 12 is a proving figure of the relations of average particle diameters X, D satisfying the three pocket conditions. From the condition that metal core average particle diameter X is smaller than second inscribed circle NSmax of composite metal nanoparticle NS, X≦2x of Equation (27) is established. Referring to FIG. 9, because triangular CDE is a right triangle, Equation (28) is through the Pythagorean theorem. When Equation (28) is expressed in terms of radii R, r, x, Equation (29) is established. When Equation (29) is solved for x, Equation (30) is established, and when this is evaluated, Equation (31) is established. By the inequality of X≦2x of Equation (27), Equations (32) and (33) are established. Equations (32) and (33) are same as the previously described Equations (16) and (17). When this conclusion is described by words, it becomes "It is necessary for metal core average particle diameter X of composite metal nanoparticles to be less than or equal to 0.06278 times average particle diameter D of metal filler particles F." By above, all of the three pocket conditions have been proved.

Table 8 is a numerical particle diameter condition table of three metallic component type composite nanometal pastes. When the average particle diameter of metal filler particles is defined as D (nm), the average particle diameter of metal nanofiller particles as d (nm), and the metal core average particle diameter of composite metal nanoparticle as X (nm), Equations (12), (13), (15), and (17) are established. When Equations (15) and (17) are used, and when particle diameter D is made to be 100-1000 nm, average particle diameter d (nm) and metal core average particle diameter X (nm) are set so that the inequality relations shown in Table 8 are satisfied. Needless to say, if it is within this numerical range, the three pocket conditions are satisfied. Particle diameter conditions No, when particle diameter D is made to be 100-1000 nm, are as shown in in the table. This is used in the tables described below, and they show which three pocket condition is satisfied by the composite nanosilver pastes described below.

TABLE 8

Particle Diameter Conditions of Three Metallic Component Composite Nanometal Paste

| Particle Diameter Condition No. | D (nm) | d (nm) | X (nm) |
|---|---|---|---|
| ① | 100 | ≦15.4 | ≦6.27 |
| ② | 200 | ≦30.9 | ≦12.5 |
| ③ | 300 | ≦46.4 | ≦18.8 |
| ④ | 400 | ≦61.8 | ≦25.1 |
| ⑤ | 500 | ≦77.3 | ≦31.3 |
| ⑥ | 600 | ≦92.8 | ≦37.6 |
| ⑦ | 700 | ≦108 | ≦43.9 |
| ⑧ | 800 | ≦123 | ≦50.2 |
| ⑨ | 900 | ≦139 | ≦56.5 |
| ⑩ | 1000 | ≦154 | ≦62.7 |

Average particle diameter of metal filler particles: D (nm)
Average particle diameter of metal nanofiller particles: d (nm)
Metal core average particle diameter of composite metal nanoparticles: X (nm)
First relation: $X < d < D$ (nm) (12)
Second relation: $X < d < 100$ (nm) (13)
Third relation: $d \leq 0.1547 D$ (nm) (15)
Fourth relation: $X \leq 0.06278$ (nm) (17)

Embodiments 101-603: PC1AgAL-PC6AgAL

Table 9 is a specific composition table of three metallic component composite nanosilver pastes PC1AgAL-PC6AgAL. The composite silver nanoparticles are expressed as CnAgAL, but the three metallic component composite nanosilver paste is expressed as PCnAgAL. The three metallic components are CnAgAL, silver nanofiller, and silver filler. CnAgAL are composite silver nanoparticles given in Table 4, and the weight percents (wt %) and average particle diameters X (nm) of the metal cores are shown. The silver nanofillers are large diameter composite silver nanoparticles given in Table 7, and their weight percentages (wt %), average particle diameters d of the metal cores (nm), and C numbers are shown. The silver fillers are commercially available silver particles, and the % by weight (wt %) and average particle diameter D (nm) are shown. The particle diameter conditions are the particle diameter conditions given in Table 8, and specific three pocket conditions are shown. For the solvent that decreases the viscosity, various solvents can be used, but methanol, ethanol, butanol, xylene, and toluene are used here. Also, for the viscosity imparting agent that increases making the viscosity, various viscosity imparting agents can be used, but oil of turpentine and a terpene derivative are used here. The paste viscosity can be adjusted freely by the ratio between the solvent and the viscosity imparting agent, but here, the solvent is set at 6.0 wt %, and the viscosity imparting agent at 4.0 wt %.

TABLE 9

Compositions of Three Metalic Component Composite Nanosilver Pastes (PC1AgAL~PC6AgAL)

| Embodiment No. | Composite Nanosilver Paste (Expression formula) | CnAgAL wt % | CnAgAL Ave. Diam. | Silver Nanofiller wt % | Silver Nanofiller Ave. Diam. | C No. | Silver Filler wt % | Silver Filler Ave. Diam. | Particle Diam. Condition | Solvent Type | Solvent (wt %) | Viscosity Imparting Agent Type | Viscosity Imparting Agent (wt %) |
|---|---|---|---|---|---|---|---|---|---|---|---|---|---|
| Embodiment 101 | PC1AgAL | 60% | 51 nm | 15% | 92 nm | 2 | 15% | 900 nm | ⑨ | Methanol | 6.0 | Oil of Turpentine | 4.0 |
| Embodiment 102 | PC1AgAL | 40 | 51 | 25 | 92 | 2 | 25 | 900 | ⑨ | Methanol | 6.0 | Oil of Turpentine | 4.0 |
| Embodiment 103 | PC1AgAL | 20 | 51 | 30 | 92 | 2 | 40 | 900 | ⑨ | Methanol | 6.0 | Oil of Turpentine | 4.0 |
| Embodiment 201 | PC2AgAL | 60 | 46 | 15 | 92 | 2 | 15 | 800 | ⑧ | Ethanol | 6.0 | Terpene Derivative | 4.0 |
| Embodiment 202 | PC2AgAL | 40 | 46 | 25 | 92 | 2 | 25 | 800 | ⑧ | Ethanol | 6.0 | Terpene Derivative | 4.0 |
| Embodiment 203 | PC2AgAL | 20 | 46 | 30 | 92 | 2 | 40 | 800 | ⑧ | Ethanol | 6.0 | Terpene Derivative | 4.0 |
| Embodiment 301 | PC3AgAL | 60 | 42 | 15 | 92 | 2 | 15 | 700 | ⑦ | Ethanol | 6.0 | Oil of Turpentine | 4.0 |
| Embodiment 302 | PC3AgAL | 40 | 42 | 25 | 92 | 2 | 25 | 700 | ⑦ | Ethanol | 6.0 | Oil of Turpentine | 4.0 |
| Embodiment 303 | PC3AgAL | 20 | 42 | 30 | 92 | 2 | 40 | 700 | ⑦ | Ethanol | 6.0 | Oil of Turpentine | 4.0 |
| Embodiment 401 | PC4AgAL | 60 | 37 | 15 | 75 | 4 | 15 | 600 | ⑥ | Butanol | 6.0 | Oil of Turpentine | 4.0 |
| Embodiment 402 | PC4AgAL | 40 | 37 | 25 | 75 | 4 | 25 | 600 | ⑥ | Butanol | 6.0 | Oil of Turpentine | 4.0 |
| Embodiment 403 | PC4AgAL | 20 | 37 | 30 | 75 | 4 | 40 | 600 | ⑥ | Butanol | 6.0 | Oil of Turpentine | 4.0 |
| Embodiment 501 | PC5AgAL | 60 | 34 | 15 | 75 | 4 | 15 | 600 | ⑥ | Xylene | 6.0 | Oil of Turpentine | 4.0 |
| Embodiment 502 | PC5AgAL | 40 | 34 | 25 | 75 | 4 | 25 | 600 | ⑥ | Xylene | 6.0 | Oil of Turpentine | 4.0 |
| Embodiment 503 | PC5AgAL | 20 | 34 | 30 | 75 | 4 | 40 | 600 | ⑥ | Xylene | 6.0 | Oil of Turpentine | 4.0 |
| Embodiment 601 | PC6AgAL | 60 | 32 | 15 | 75 | 4 | 15 | 600 | ⑥ | Toluene | 6.0 | Oil of Turpentine | 4.0 |
| Embodiment 602 | PC6AgAL | 40 | 32 | 25 | 75 | 4 | 25 | 600 | ⑥ | Toluene | 6.0 | Oil of Turpentine | 4.0 |
| Embodiment 603 | PC6AgAL | 20 | 32 | 30 | 75 | 4 | 40 | 600 | ⑥ | Toluene | 6.0 | Oil of Turpentine | 4.0 |

Embodiments 701-123: PC7AgAL-PC12AgAL

Figure 13:
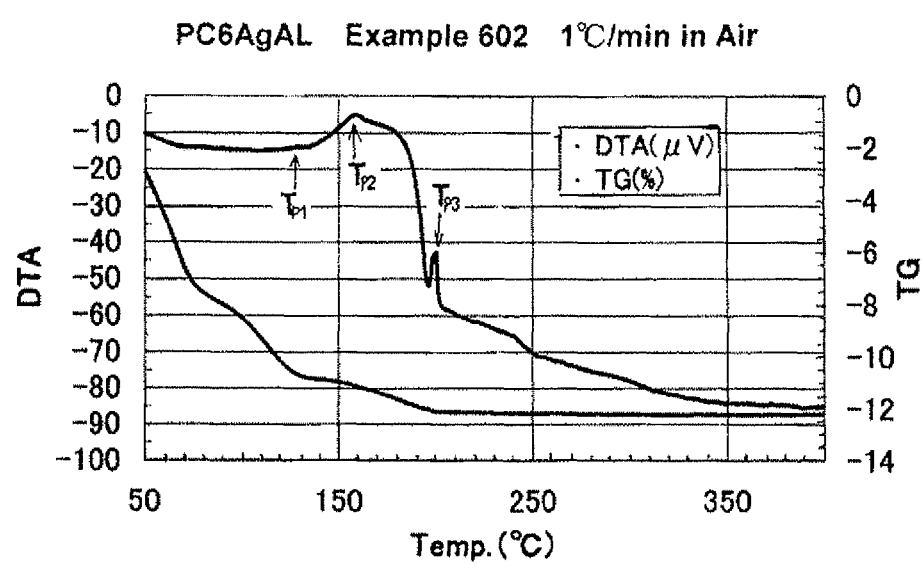
FIG. 13 is a thermal analysis graph (temperature increase rate: 1° C./min) of Embodiment 602 of PC6AgAL concerning the present invention.

Table 10 is a specific composition table of three metallic component composite nanosilver pastes PC7AgAL-PC12AgAL. The composite silver nanoparticles are expressed as CnAgAL, and the three metallic component composite nanosilver pastes are expressed as PCnAgAL. The three metallic components are CnAgAL, silver nanofiller, and silver tiller. CnAgAL are composite silver nanoparticles given in Table 4, and the weight percents (wt %) and average particle diameters X (nm) of the metal cores are shown. The silver nanofillers are large diameter composite silver nanoparticles given in Table 7, and their weight percentages (wt %), average particle diameters d of the metal cores (nm), and C numbers are shown. The silver fillers are commercially available silver particles, and the % by weight (wt %) and average particle diameter D (nm) are shown. The particle diameter conditions are the particle diameter conditions given in Table 8, and specific three pocket conditions are shown. For the solvent that decreases the viscosity, various solvents can be used, but butanol, ethanol, and hexane are used here. Also, for the viscosity imparting agent that increases making the viscosity, various viscosity imparting agents can be used, but oil of turpentine and a terpine derivative are used here. The paste viscosity can be adjusted freely by the ratio between the solvent and the viscosity imparting agent, but here too, the solvent is set at 6.0 wt %, and the viscosity imparting agent at 4.0 wt %.

be defined by the TG decrease start temperature after the viscosity imparting agent has completely evaporated. Paste decomposition temperature Tp2 is defined with the earliest peak temperature (first peak temperature). There are two peaks in this DTA, and because the maximum peak is the first peak, the maximum peak temperature gives decomposition temperature Tp2. In FIG. 13, the second peak is lower from the first peak, but there are cases in which the second peak is higher. Therefore, paste decomposition temperature Tp2 is defined here by the earliest peak temperature (first peak temperature). The present inventors currently think that the first peak corresponds to the decomposition temperature of minute particles in the composite silver nanoparticles, and the second peak corresponds to the decomposition temperature of larger particles or aggregated particles within the composite silver nanoparticles. Paste metalization temperature Tp3 is defined by the end temperature of the last peak, but when the last peak is a steep peak, defining with the steep peak temperature does not cause much difference. This last peak is thought to give the temperature in which the silver cores of said minute particles, large particles, or aggregated particles that have become uncovered, and silver filler particles move mutually, to form a compact metal layer (silver layer). In FIG. 13, Tp1=129° C., Tp2=160° C., Tp3=202° C. were obtained.

TABLE 10

Compositions of Three Metalic Component Composite Nanosilver Pastes (PC7AgAL~PC12AgAL)

| Embodiment No. | Composite Nanosilver Paste (Expression formula) | CnAgAL wt % | CnAgAL Ave. Diam. | Silver Nanofiller wt % | Silver Nanofiller Ave. Diam. | C No. | Silver Filler wt % | Silver Filler Ave. Diam. | Particle Diam. Condition | Solvent Type | Solvent (wt %) | Viscosity Imparting Agent Type | (wt %) |
|---|---|---|---|---|---|---|---|---|---|---|---|---|---|
| Embodiment 701 | PC7AgAL | 60% | 28 nm | 15% | 75 nm | 4 | 15% | 500 nm | ⑤ | Butanal | 6.0 | Oil of Turpentine | 4.0 |
| Embodiment 702 | PC7AgAL | 40 | 28 | 25 | 75 | 4 | 25 | 500 | ⑤ | Butanol | 6.0 | Oil of Turpentine | 4.0 |
| Embodiment 703 | PC7AgAL | 20 | 28 | 30 | 75 | 4 | 40 | 500 | ⑤ | Butanol | 6.0 | Oil of Turpentine | 4.0 |
| Embodiment 801 | PC8AgAL | 60 | 24 | 15 | 92 | 2 | 15 | 700 | ⑦ | Ethanol | 6.0 | Terpene Derivative | 4.0 |
| Embodiment 802 | PC8AgAL | 40 | 24 | 25 | 92 | 2 | 25 | 700 | ⑦ | Ethanol | 6.0 | Terpene Derivative | 4.0 |
| Embodiment 803 | PC8AgAL | 20 | 24 | 30 | 92 | 2 | 40 | 700 | ⑦ | Ethanol | 6.0 | Terpene Derivative | 4.0 |
| Embodiment 901 | PC9AgAL | 60 | 21 | 15 | 57 | 6 | 15 | 400 | ④ | Ethanol | 6.0 | Oil of Turpentine | 4.0 |
| Embodiment 902 | PC9AgAL | 40 | 21 | 25 | 57 | 6 | 25 | 400 | ④ | Ethanol | 6.0 | Oil of Turpentine | 4.0 |
| Embodiment 903 | PC9AgAL | 20 | 21 | 30 | 57 | 6 | 40 | 400 | ④ | Ethanol | 6.0 | Oil of Turpentine | 4.0 |
| Embodiment 101 | PC10AgAL | 60 | 17 | 15 | 57 | 6 | 15 | 600 | ⑥ | Hexane | 6.0 | Terpene Derivative | 4.0 |
| Embodiment 102 | PC10AgAL | 40 | 17 | 25 | 57 | 6 | 25 | 600 | ⑥ | Hexane | 6.0 | Terpene Derivative | 4.0 |
| Embodiment 103 | PC10AgAL | 20 | 17 | 30 | 57 | 6 | 40 | 600 | ⑥ | Hexane | 6.0 | Terpene Derivative | 4.0 |
| Embodiment 111 | PC11AgAL | 60 | 13 | 15 | 75 | 4 | 15 | 600 | ⑥ | Ethanol | 6.0 | Terpene Derivative | 4.0 |
| Embodiment 112 | PC11AgAL | 40 | 13 | 25 | 75 | 4 | 25 | 600 | ⑥ | Ethanol | 6.0 | Terpene Derivative | 4.0 |
| Embodiment 113 | PC11AgAL | 20 | 13 | 30 | 75 | 4 | 40 | 600 | ⑥ | Ethanol | 6.0 | Terpene Derivative | 4.0 |
| Embodiment 121 | PC12AgAL | 60 | 10 | 15 | 34 | 8 | 15 | 300 | ③ | Butanol | 6.0 | Terpene Derivative | 4.0 |
| Embodiment 122 | PC12AgAL | 40 | 10 | 25 | 34 | 8 | 25 | 300 | ③ | Butanol | 6.0 | Terpene Derivative | 4.0 |
| Embodiment 123 | PC12AgAL | 20 | 10 | 30 | 34 | 8 | 40 | 300 | ③ | Butanol | 6.0 | Terpene Derivative | 4.0 |

FIG. 13 is a thermal analysis graph in which PC6AgAL (Embodiment 602) was thermally analyzed under atmosphere at a temperature increase rate of PC/min. Tp1 indicates the paste decomposition start temperature, Tp2 the paste decomposition temperature, and Tp3 the paste metalization temperature (silverization temperature). Paste decomposition start temperature Tp1 is defined by the DTA increase start temperature. The first decrease of the TG curve shows an evaporation of the alcohol, and the next decrease indicates a decrease of the viscosity imparting agent. Therefore, if paste decomposition start temperature T1 is defined by TG, it can Table 11 is a relational table of characteristic temperatures Tp1, Tp2, Tp3 of composite nanosilver pastes PC1AgAL-PC6AgAL. About PCnAgAL of Embodiments 101-603 (n=1-6), characteristic temperatures Tp1, Tp2, Tp3 were measured by thermally analyzing under atmosphere at a temperature increase rate of 1° C./min in the same manner as in FIG. 13. Metalization temperature Tp3 increases with the C number, and to be specific, it varies from 152° C. to 203° C. Tp3≦300° C. is established, and it shows that the present invention is a composite nanosilver paste that can go through a firing at low temperature. From this table, it was demonstrated that Tp1<Tp2<Tp3 and Tp3≦300° C. are established.

TABLE 11

Characteristic Temperatures Tp1, Tp2, Tp3 of Three Metallic Component Composite Nanosilver Pastes
(PC1AgAL~PC6AgAL) Temperature Increase Rate: 1° C./min

| Embodiment No. | Composite Nanosilver Paste (Expression formula) | CnAgAL wt % | CnAgAL Ave. Diam. | Silver Nanofiller wt % | Silver Nanofiller Ave. Diam. | C No. | Silver Filler wt % | Silver Filler Ave. Diam. | Decomposition Start Temperature Tp1 (° C.) | Decomposition Temperature Tp2 (° C.) | Silverization Temperature Tp3 (° C.) |
|---|---|---|---|---|---|---|---|---|---|---|---|
| Embodiment 101 | PC1AgAL | 60% | 51 nm | 15% | 92 nm | 2 | 15% | 900 nm | 80 | 116 | 155 |
| Embodiment 102 | PC1AgAL | 40 | 51 | 25 | 92 | 2 | 25 | 900 | 79 | 114 | 153 |
| Embodiment 103 | PC1AgAL | 20 | 51 | 30 | 92 | 2 | 40 | 900 | 77 | 113 | 152 |
| Embodiment 201 | PC2AgAL | 60 | 46 | 15 | 92 | 2 | 15 | 800 | 89 | 123 | 165 |
| Embodiment 202 | PC2AgAL | 40 | 46 | 25 | 92 | 2 | 25 | 800 | 87 | 121 | 164 |
| Embodiment 203 | PC2AgAL | 20 | 46 | 30 | 92 | 2 | 40 | 800 | 85 | 119 | 163 |
| Embodiment 301 | PC3AgAL | 60 | 42 | 15 | 92 | 2 | 15 | 700 | 99 | 131 | 173 |
| Embodiment 302 | PC3AgAL | 40 | 42 | 25 | 92 | 2 | 25 | 700 | 98 | 129 | 171 |
| Embodiment 303 | PC3AgAL | 20 | 42 | 30 | 92 | 2 | 40 | 700 | 97 | 129 | 170 |
| Embodiment 401 | PC4AgAL | 60 | 37 | 15 | 75 | 4 | 15 | 600 | 112 | 144 | 186 |
| Embodiment 402 | PC4AgAL | 40 | 37 | 25 | 75 | 4 | 25 | 600 | 109 | 142 | 185 |
| Embodiment 403 | PC4AgAL | 20 | 37 | 30 | 75 | 4 | 40 | 600 | 107 | 141 | 185 |
| Embodiment 501 | PC5AgAL | 60 | 34 | 15 | 75 | 4 | 15 | 600 | 127 | 158 | 191 |
| Embodiment 502 | PC5AgAL | 40 | 34 | 25 | 75 | 4 | 25 | 600 | 125 | 157 | 192 |
| Embodiment 503 | PC5AgAL | 20 | 34 | 30 | 75 | 4 | 40 | 600 | 124 | 157 | 191 |
| Embodiment 601 | PC6AgAL | 60 | 32 | 15 | 75 | 4 | 15 | 600 | 130 | 162 | 203 |
| Embodiment 602 | PC6AgAL | 40 | 32 | 25 | 75 | 4 | 25 | 600 | 129 | 160 | 202 |
| Embodiment 603 | PC6AgAL | 20 | 32 | 30 | 75 | 4 | 40 | 600 | 129 | 159 | 201 |

Table 12 is a relational table of characteristic temperatures Tp1, Tp2, Tp3 of composite nanosilver pastes PC7AgAL-PC12AgAL. On PCnAgAL of Embodiments 701-123 (n=7-12), characteristic temperatures Tp1, Tp2, Tp3 were measured by thermally analyzing under atmosphere at a temperature increase rate of 1° C./min, in the same manner as FIG. 13. Metalization temperature Tp3 increases with the C number, and specifically, it changes from 214° C. to 273° C., Tp3≦300° C. is established, and it shows that the present invention is a composite nanosilver paste that can go through a firing at low temperature. From this table, it was demonstrated that Tp1<Tp2<Tp3 and Tp3≦300° C. are established.

TABLE 12

Characteristic Temperatures Tp1, Tp2, Tp3 of Three Metallic Component Composite Nanosilver Pastes
(PC7AgAL~PC12AgAL) Temperature Increase Rate: 1° C./min

| Embodiment No. | Composite Nanosilver Paste (Expression formula) | CnAgAL wt % | CnAgAL Ave. Diam. | Silver Nanofiller wt % | Silver Nanofiller Ave. Diam. | C No. | Silver Filler wt % | Silver Filler Ave. Diam. | Decomposition Start Temperature Tp1 (° C.) | Decomposition Temperature Tp2 (° C.) | Silverization Temperature Tp3 (° C.) |
|---|---|---|---|---|---|---|---|---|---|---|---|
| Embodiment 701 | PC7AgAL | 60% | 28 nm | 15% | 75 nm | 4 | 15% | 500 nm | 143 | 179 | 216 |
| Embodiment 702 | PC7AgAL | 40 | 28 | 25 | 75 | 4 | 25 | 500 | 143 | 177 | 215 |
| Embodiment 703 | PC7AgAL | 20 | 28 | 30 | 75 | 4 | 40 | 500 | 141 | 175 | 214 |
| Embodiment 801 | PC8AgAL | 60 | 24 | 15 | 92 | 2 | 15 | 700 | 153 | 187 | 227 |
| Embodiment 802 | PC8AgAL | 40 | 24 | 25 | 92 | 2 | 25 | 700 | 152 | 186 | 227 |
| Embodiment 803 | PC8AgAL | 20 | 24 | 30 | 92 | 2 | 40 | 700 | 150 | 184 | 226 |
| Embodiment 901 | PC9AgAL | 60 | 21 | 15 | 57 | 6 | 15 | 400 | 168 | 198 | 240 |
| Embodiment 902 | PC9AgAL | 40 | 21 | 25 | 57 | 6 | 25 | 400 | 166 | 197 | 238 |
| Embodiment 903 | PC9AgAL | 20 | 21 | 30 | 57 | 6 | 40 | 400 | 165 | 197 | 238 |
| Embodiment 101 | PC10AgAL | 60 | 17 | 15 | 57 | 6 | 15 | 600 | 176 | 205 | 247 |
| Embodiment 102 | PC10AgAL | 40 | 17 | 25 | 57 | 6 | 25 | 600 | 175 | 203 | 246 |
| Embodiment 103 | PC10AgAL | 20 | 17 | 30 | 57 | 6 | 40 | 600 | 174 | 201 | 245 |
| Embodiment 111 | PC11AgAL | 60 | 13 | 15 | 75 | 4 | 15 | 600 | 185 | 218 | 262 |
| Embodiment 112 | PC11AgAL | 40 | 13 | 25 | 75 | 4 | 25 | 600 | 184 | 216 | 259 |
| Embodiment 113 | PC11AgAL | 20 | 13 | 30 | 75 | 4 | 40 | 600 | 184 | 216 | 259 |
| Embodiment 121 | PC12AgAL | 60 | 10 | 15 | 34 | 8 | 15 | 300 | 201 | 234 | 273 |
| Embodiment 122 | PC12AgAL | 40 | 10 | 25 | 34 | 8 | 25 | 300 | 199 | 232 | 271 |
| Embodiment 123 | PC12AgAL | 20 | 10 | 30 | 34 | 8 | 40 | 300 | 197 | 231 | 270 |

Figure 14:
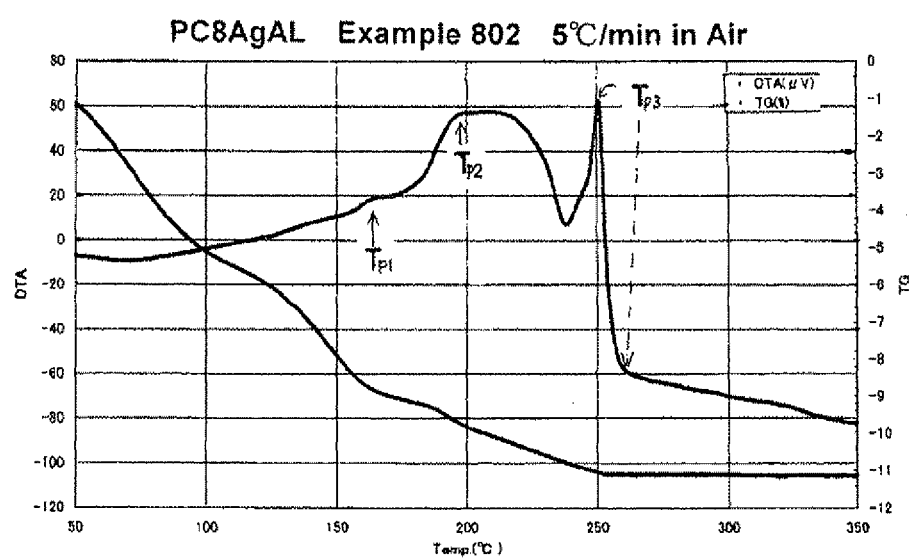
FIG. 14 is a thermal analysis graph (temperature increase rate: 5° C./min) of Embodiment 802 of PC8AgAL concerning the present invention.

Next, the characteristics was examined in which the temperature increase rate was increase to 1° C./min or greater. FIG. 14 is a thermal analysis graph in which PC8AgAL (Embodiment 802) was thermally analyzed under atmosphere at a temperature increase rate 5° C./min. Tp1 indicates the paste decomposition start temperature, Tp2 the paste decomposition temperature, and Tp3 the paste metalization temperature (silverization temperature). Paste metalization temperature Tp3 is indicated by the peak temperature as in the solid arrow, but because it is a steep peak, it may be defined by the peak ending temperature as in the dotted arrow. From this experiment, Tp1=163° C., Tp2=196° C., Tp3=251° C. were obtained. As compared to Embodiment 802 of Table 12, It was found that characteristic temperatures Tp1, Tp2, Tp3 increased by increasing VT from 1° C./min to 5° C./min.

Table 13 shows the temperature increase rate dependency of the characteristic temperatures in the thermal analyses of the C10AgAL powder (Embodiment 10) and the PC10AgAL paste (Embodiment 102). Table 13 and Tables 11, 12 were put together, and the following results became clear by the thermal analyses of the PCnAgAL pastes under atmosphere at temperature increase rate VT=1° C./min. Here, the temperature unit is ° C.

$$Tp1 < Tp2 < Tp3 \quad (P1)$$

$$Tp2 - 100 < Tp1 < Tp2 \quad (P2)$$

$$Tp3 \leq 300 \quad (P3)$$

The above results are similar to the CnAgAL powders.

Furthermore, the next results were obtained by tests in which temperature increase rate VT was varied between 1-20(° C./min). VT(° C./min) is chosen from within a range of $1 \leq VT \leq 20$ (° C./min).

$$Tp1(VT) < Tp2(VT) < Tp3(VT) \quad (P4)$$

$$Tp2(VT) - 100 < Tp1(VT) < Tp2(VT) \quad (P5)$$

$$Tp3(VT) < Tp3(1° C./min) + 100 \quad (P6)$$

FIG. 15 is a characteristic temperature figure of CnAgAL and PCnAgAL concerning the present invention. In this figure, the following Equation (P7)-(P9) are described as well as the previously described Equations (P1)-(P6). The mutual relations of the characteristic temperatures of the CnAgAL powders and the PCnAgAL pastes are shown.

$$T1(VT) < Tp1(VT) < T1(VT) + 100 \quad (P7)$$

$$T2(VT) < Tp2(VT) < T2(VT) + 100 \quad (P8)$$

$$T3(VT) < Tp3(VT) < T3(VT) + 100 \quad (P9)$$

What these equations mean is that characteristic temperatures Tp1, Tp2, Tp3 of the paste are found above and within 100° C. of each of characteristic temperatures T1, T2, T3 of the powder.

FIG. 16 is an outlined schematic diagram of a bonding examination and a bond strength examination by a three metallic component type composite nanometal paste concerning the present invention. In (16A), paste layer 6 of 200 μm is formed between lower body disk 4 of diameter d4=10 mm and upper body disk 2 of diameter d2=5 mm by means of a PCnAgAL paste of the present invention, and a paste bonding body is made.

Said upper body disk 2 and said lower body disk 4 are made of Cu. In (16B), said paste bonding body is fired at 350° C. under no-load and nitrogen gas (it may be another inert gas). By the way, "no pressure" described in (16B) of FIG. 16 signifies a state of no-load, in which only the self weight is applied, and no load is applied. The temperature is raised from room temperature, 20° C., for 30 minutes at a temperature increase rate of 11° C./min, and a firing temperature of 350° C. is reached. This 350° C. is maintained for 1 minute, and afterwards it is cooled to room temperature, 20° C., by a natural cooling for about 90 minutes. In this way, said paste bonding body is fired, to form a sintered bonding body. In (16C), the shear strength of this sintered bonding body, that is to say, the bond strength is measured. Paste layer 6 sinters by firing to form metal layer 8 of metal layer thickness T8=30 μm, and because it is a silver material, it may be termed as silver layer 8. Shear force f is acted on the plane direction of upper body disk 2 and lower body disk 4, and shear force limit f is measured by applying until destruction by the shear fracture. When bond area is denoted S, bond strength BS is given as BS=f/S, and a bond strength greater than or equal to 10 MPa is a standard condition required for a paste.

TABLE 13

Temperature Increase Rate Dependence in Thermal Analyses of C10AgAl Powder (Embodiment 10) and PC10AgAL Paste (Embodiment 102)

| Temperature Increase Rate [° C./min] | Powder Decomposition Start Temperature $T_1$ [° C.] | Paste Decomposition Start Temperature $T_{P1}$ [° C.] | Powder Decomposition Temperature $T_2$ [° C.] | Paste Decomposition Temperature $T_{P2}$ [° C.] | Powder Metalization Temperature $T_3$ [° C.] | Paste Metalization Temperature $T_{P3}$ [° C.] |
|---|---|---|---|---|---|---|
| 1  | 105 | 175 | 174 | 203 | 191 | 246 |
| 3  | 125 | 192 | 194 | 226 | 233 | 269 |
| 5  | 141 | 198 | 204 | 235 | 241 | 280 |
| 10 | 145 | 215 | 212 | 251 | 256 | 305 |
| 15 | 148 | 216 | 221 | 257 | 265 | 311 |
| 20 | 158 | 224 | 227 | 266 | 274 | 325 |

Table 14 is an enumeration table of bond strengths BS (MPa) under no-load and nitrogen of three metallic component composite nanosilver pastes PC1AgAL-PC6AgAL. With respect to the pastes of Embodiments 101-603, it was confirmed that all bond strengths exceeded 10 MPa. Therefore, it was demonstrated that three metallic component composite nanosilver pastes PC1AgAL-PC6AgAL concerning the present invention are pastes that have completely cleared the practical use conditions.

TABLE 14

Bond Strength under Nitrogen and No-Load of Three Metallic Component Composite Nanosilver Pastes (PC1AgAL~PC6AgAL): BS(MPa)

| Embodiment No. | Composite Nanosilver Paste (Expression formula) | CnAgAL wt % | CnAgAL Ave. Diam. | Silver Nanofiller wt % | Silver Nanofiller Ave. Diam. | C No. | Silver Filler wt % | Silver Filler Ave. Diam. | Bond Strength MPa |
|---|---|---|---|---|---|---|---|---|---|
| Embodiment 101 | PC1AgAL | 60% | 51 nm | 15% | 92 nm | 2 | 15% | 900 nm | 15.8 |
| Embodiment 102 | PC1AgAL | 40 | 51 | 25 | 92 | 2 | 25 | 900 | 14.9 |
| Embodiment 103 | PC1AgAL | 20 | 51 | 30 | 92 | 2 | 40 | 900 | 20.5 |
| Embodiment 201 | PC2AgAL | 60 | 46 | 15 | 92 | 2 | 15 | 800 | 17.3 |
| Embodiment 202 | PC2AgAL | 40 | 46 | 25 | 92 | 2 | 25 | 800 | 18.6 |
| Embodiment 203 | PC2AgAL | 20 | 46 | 30 | 92 | 2 | 40 | 800 | 16.9 |
| Embodiment 301 | PC3AgAL | 60 | 42 | 15 | 92 | 2 | 15 | 700 | 21.3 |
| Embodiment 302 | PC3AgAL | 40 | 42 | 25 | 92 | 2 | 25 | 700 | 16.5 |
| Embodiment 303 | PC3AgAL | 20 | 42 | 30 | 92 | 2 | 40 | 700 | 17.8 |
| Embodiment 401 | PC4AgAL | 60 | 37 | 15 | 75 | 4 | 15 | 600 | 28.6 |
| Embodiment 402 | PC4AgAL | 40 | 37 | 25 | 75 | 4 | 25 | 600 | 34.8 |
| Embodiment 403 | PC4AgAL | 20 | 37 | 30 | 75 | 4 | 40 | 600 | 31.2 |
| Embodiment 501 | PC5AgAL | 60 | 34 | 15 | 75 | 4 | 15 | 600 | 20.9 |
| Embodiment 502 | PC5AgAL | 40 | 34 | 25 | 75 | 4 | 25 | 600 | 19.7 |
| Embodiment 503 | PC5AgAL | 20 | 34 | 30 | 75 | 4 | 40 | 600 | 18.3 |
| Embodiment 601 | PC6AgAL | 60 | 32 | 15 | 75 | 4 | 15 | 600 | 16.4 |
| Embodiment 602 | PC6AgAL | 40 | 32 | 25 | 75 | 4 | 25 | 600 | 22.8 |
| Embodiment 603 | PC6AgAL | 20 | 32 | 30 | 75 | 4 | 40 | 600 | 23.3 |

Table 15 is an enumeration table of bond strengths BS (MPa) under no-load and nitrogen of three metallic component composite nanosilver pastes PC7AgAL-PC12AgAL. With respect to the pastes of Embodiments 701-123, it was equally confirmed that all bond strengths exceeded 10 MPa. Therefore, it was demonstrated that three metallic component composite nanosilver pastes PC7AgAL-PC12AgAL concerning the present invention are pastes that have completely cleared the practical use conditions.

TABLE 15

Bond Strength under Nitrogen and No-Load of Three Metallic Component Composite Nanosilver Pastes (PC7AgAL~PC12AgAL): BS(MPa)

| Embodiment No. | Composite Nanosilver Paste (Expression formula) | CnAgAL wt % | CnAgAL Ave. Diam. | Silver Nanofiller wt % | Silver Nanofiller Ave. Diam. | C No. | Silver Filler wt % | Silver Filler Ave. Diam. | Bond Strength MPa |
|---|---|---|---|---|---|---|---|---|---|
| Embodiment 701 | PC7AgAL | 60% | 28 nm | 15% | 75 nm | 4 | 15% | 500 nm | 19.2 |
| Embodiment 702 | PC7AgAL | 40 | 28 | 25 | 75 | 4 | 25 | 500 | 22.4 |
| Embodiment 703 | PC7AgAL | 20 | 28 | 30 | 75 | 4 | 40 | 500 | 21.7 |
| Embodiment 801 | PC8AgAL | 60 | 24 | 15 | 92 | 2 | 15 | 700 | 29.4 |
| Embodiment 802 | PC8AgAL | 40 | 24 | 25 | 92 | 2 | 25 | 700 | 32.3 |
| Embodiment 803 | PC8AgAL | 20 | 24 | 30 | 92 | 2 | 40 | 700 | 27.6 |
| Embodiment 901 | PC9AgAL | 60 | 21 | 15 | 57 | 6 | 15 | 400 | 20.5 |
| Embodiment 902 | PC9AgAL | 40 | 21 | 25 | 57 | 6 | 25 | 400 | 19.6 |
| Embodiment 903 | PC9AgAL | 20 | 21 | 30 | 57 | 6 | 40 | 400 | 18.9 |
| Embodiment 101 | PC10AgAL | 60 | 17 | 15 | 57 | 6 | 15 | 600 | 25.8 |
| Embodiment 102 | PC10AgAL | 40 | 17 | 25 | 57 | 6 | 25 | 600 | 27.6 |
| Embodiment 103 | PC10AgAL | 20 | 17 | 30 | 57 | 6 | 40 | 600 | 24.1 |
| Embodiment 111 | PC11AgAL | 60 | 13 | 15 | 75 | 4 | 15 | 600 | 22.9 |
| Embodiment 112 | PC11AgAL | 40 | 13 | 25 | 75 | 4 | 25 | 600 | 24.2 |
| Embodiment 113 | PC11AgAL | 20 | 13 | 30 | 75 | 4 | 40 | 600 | 23.1 |
| Embodiment 121 | PC12AgAL | 60 | 10 | 15 | 34 | 8 | 15 | 300 | 18.7 |
| Embodiment 122 | PC12AgAL | 40 | 10 | 25 | 34 | 8 | 25 | 300 | 23.6 |
| Embodiment 123 | PC12AgAL | 20 | 10 | 30 | 34 | 8 | 40 | 300 | 21.8 |

The present invention is not limited to the embodiments described above. Various modifications, design alterations, and others that do not involve a departure from the technical concept of the present invention are also included in the technical scope of the present invention.

INDUSTRIAL APPLICABILITY

By the three metallic component type composite nanometal paste of the present invention, it was demonstrated that bond strength BS under no-load and nitrogen becomes greater than 10 MPa, which had been impossible with a conventional lead-free solder. Therefore, as well as general lead-free solders, lead-free solders that could be utilized as a substitute for high temperature lead solders permitted especially by the RoHS Directive are provided. Their extent of use is extremely wide, and they could be applied to various uses such as electronic materials such as bond materials, printed wiring, and electroconductive materials; magnetic materials such as magnetic storage media, electromagnetic wave absorbers, and electromagnetic wave resonators; structural materials such as far infrared materials and composite coating formation materials; ceramic or metallic materials such as sintering aids and coating materials; and medical materials.

DENOTATION OF REFERENCE NUMERALS

2 Upper body disk
4 Lower body disk
6 Paste layer
8 Metal layer
d2 Diameter
d4 Diameter
T6 Paste thickness
T8 Metal layer thickness
f Shear force
S Bond area
BS Bond strength
F Metal filler particle
NFmax First inscribed circle
NSmax Second inscribed circle
NF Metal nanofiller particle
NS Composite silver nanoparticle

The invention claimed is:

1. A composite nanometal paste, characterized in that said composite nanometal paste consists of, as metal components,
 a composite metal nanoparticle on which an organic coating layer is formed at a circumference of a metal core with an average particle diameter of X (nm),
 a metal nanofiller particle with an average particle diameter of d (nm) that is a composite metal nanofiller particle on which an organic coating layer is formed at a circumference of a metal core, and
 a metal filler particle with an average particle diameter of D (nm);
 it has a first relation of $$X<d<D$$

and a second relation of $$X<d<100 \text{ (nm)};$$

wherein said average particle diameter d of said metal nanofiller particle has a size so that said metal nanofiller particle is inserted inside a three pocket formed when three said metal filler particles are placed on a plane in a mutually contacting condition;
 wherein said average particle diameter X of a metal core of said composite metal nanoparticle has a size so that said metal core of said composite metal nanoparticle is inserted inside a gap of said metal filler particles and said metal nanofiller particle in said three pocket; and
 said composite metal nanoparticle, said metal nanofiller particle, and said metal filler particle sinter compactly when a metal layer is formed by volatilization of said organic coating layer of said composite metal nanoparticle and said organic coating layer of said metal nanofiller particle by firing.

2. The composite nanometal paste according to claim 1, wherein said average particle diameters X, d, and D satisfy $$X \leq [^{1}/_{3} - 2/\{3(2\sqrt{3}-1)\}]D$$

and $$d \leq (2/\sqrt{3}-1)D.$$

3. The composite nanometal paste according to claim 1, wherein a solvent and/or a viscosity imparting agent is added.

4. The composite nanometal paste according to claim 1, wherein paste metalization temperature Tp3 (° C.) is less than or equal to 300° C. when said composite nanometal paste is thermally analyzed under atmosphere at temperature increase rate VT=1° C./min.

5. The composite nanometal paste according to claim 1, wherein paste metalization temperature Tp3 (VT) satisfies $$Tp3(VT) < Tp3(1° \text{ C./min}) + 100,$$

where a unit of temperature is ° C., when said composite nanometal paste is thermally analyzed under atmosphere at temperature increase rate VT=1-20° C/min.

6. The composite nanometal paste according to claim 1, wherein paste decomposition start temperature Tp1(VT) and paste decomposition temperature Tp2(VT) satisfy $$Tp2(VT)-100 < Tp1(VT) < Tp2(VT),$$

where a unit of temperature is ° C., when said composite nanometal paste is thermally analyzed under atmosphere at temperature increase rate VT=1-20° C/min.

7. The composite nanometal paste according to claim 1, wherein, when said composite nanometal paste is thermally analyzed under atmosphere at temperature increase rate VT=1-20° C/min, paste decomposition start temperature Tp1 (VT), paste decomposition temperature Tp2(VT), and paste metalization temperature Tp3(VT) increase with an increase of said temperature increase rate VT, while satisfying a relation of $$Tp1(VT) < Tp2(VT) < Tp3(VT),$$

a unit of temperature being ° C.

8. The composite nanometal paste according to claim 1, wherein, when
 said composite metal nanoparticle is thermally analyzed under atmosphere at temperature increase rate VT(° C/min), a unit of temperature being ° C., so that decomposition start temperature T1(VT), decomposition temperature T2(VT), along with metalization temperature T3(VT) of said composite metal nanoparticle are defined, and
 said composite nanometal paste is thermally analyzed under atmosphere at temperature increase rate VT (° C/min), so that when paste decomposition start temperature Tp1(VT), paste decomposition temperature Tp2 (VT), along with paste metalization temperature Tp3 (VT) of said composite nanometal paste are defined,
 one or more of $T1(VT) < Tp1(VT) < T1(VT)+100,$ $T2(VT) < Tp2(VT) < T2(VT)+100,$ $T3(VT) < Tp3(VT) < T3(VT)+100$ are established.

9. A method of bonding, characterized in that the composite nanometal paste according to claim 1 is provided, a paste layer is formed between a lower body and an upper body by said composite nanometal paste, and said lower body and said upper body are bonded by sintering said paste layer into a metal layer by application of heat.

10. The method of bonding according to claim 9, wherein a shear stress, that is to say, a bond strength, when said lower body and said upper body are sheared in a direction parallel to said metal layer, said lower body and said upper body being joined through said metal layer under no-load and inert gas, is greater than or equal to 10 (MPa).

11. An electronic component, characterized in that it was produced by the method of bonding according to claim 9.

* * * * *